US012270534B2

(12) United States Patent
Paul et al.

(10) Patent No.: US 12,270,534 B2
(45) Date of Patent: Apr. 8, 2025

(54) LIGHT FIXTURE CONTROL MODULE

(71) Applicants: TE Connectivity Solutions GmbH, Schaffhausen (CH); Tyco Electronics UK Ltd, Swindon (GB); TE Connectivity Electronics Spain, S.L.U., Barcelona (ES)

(72) Inventors: Randall Bobby Paul, Elizabethville, PA (US); Matthew Edward Mostoller, Hummelstown, PA (US); Jonathan Catchpole, West Hanney (GB); Royer Zuleta, Barcelona (ES)

( * ) Notice: Subject to any disclaimer, the term of this patent is extended or adjusted under 35 U.S.C. 154(b) by 0 days.

(21) Appl. No.: 18/627,848

(22) Filed: Apr. 5, 2024

(65) Prior Publication Data

US 2024/0384865 A1 Nov. 21, 2024

Related U.S. Application Data

(60) Provisional application No. 63/503,285, filed on May 19, 2023.

(51) Int. Cl.
*F21V 23/00* (2015.01)
*F21V 23/04* (2006.01)
*F21V 23/06* (2006.01)

(52) U.S. Cl.
CPC .......... *F21V 23/008* (2013.01); *F21V 23/001* (2013.01); *F21V 23/0442* (2013.01); *F21V 23/06* (2013.01)

(58) Field of Classification Search
CPC .. F21V 23/008; F21V 23/001; F21V 23/0442; F21V 23/06
See application file for complete search history.

(56) References Cited

U.S. PATENT DOCUMENTS 2,210,487 A * 8/1940 Kimmich ................. H01R 9/24 439/712
10,107,480 B1 * 10/2018 Ladewig ................. F21S 8/036
2004/0061032 A1 * 4/2004 Bradford ............... F21V 21/116 248/224.51

(Continued)

FOREIGN PATENT DOCUMENTS

DE 202020100914 U1 3/2020
DE 202021103612 U1 7/2021

(Continued)

OTHER PUBLICATIONS

Extended European Search Report for corresponding EP Application No. 24175846.5 dated Nov. 15, 2024 (11 pages).

*Primary Examiner* — Christopher E Dunay

(57) ABSTRACT

A light fixture control module includes a base that includes an inner end and an outer end. The inner end is mounted to a vertical mounting base of a light fixture. The light fixture control module includes a bracket coupled to the outer end of the base. The bracket includes a shell that has an inner chamber. The light fixture control module includes a sensor mounted to the shell of the bracket. The sensor has a sensor element, a sensor wire transmitting a control signal from the sensor element, and a sensor connector connected to an end of the sensor wire. The sensor connector is configured to be electrically connected to a fixture wire of the light fixture to control operation of a light element of the light fixture.

21 Claims, 21 Drawing Sheets

(56) References Cited

U.S. PATENT DOCUMENTS

| | | | | |
|---|---|---|---|---|
| 2008/0068841 | A1* | 3/2008 | Chi | G08B 13/189<br>362/276 |
| 2015/0124100 | A1* | 5/2015 | McRory | H04N 23/50<br>348/151 |
| 2016/0281967 | A1 | 9/2016 | Hunt, III et al. | |
| 2018/0156427 | A1* | 6/2018 | Bailey | F21V 23/001 |
| 2021/0041086 | A1 | 2/2021 | Brand et al. | |
| 2022/0082241 | A1* | 3/2022 | McDonald | H05B 45/10 |

FOREIGN PATENT DOCUMENTS

| | | | |
|---|---|---|---|
| DE | 202023101614 | U1 | 4/2023 |
| KR | 101803323 | B1 | 12/2017 |

* cited by examiner

LIGHT FIXTURE CONTROL MODULE

CROSS REFERENCE TO RELATED APPLICATIONS

This application claims benefit to U.S. Provisional Application No. 63/503,285, filed 19 May 2023, titled "LIGHT FIXTURE CONTROL MODULE", the subject matter of which is herein incorporated by reference in its entirety.

BACKGROUND OF THE INVENTION

The subject matter herein relates generally to light fixtures.

Light fixtures are used to illuminate areas, such as sidewalks, streets, parking lots, buildings, or other areas. The light fixtures are mounted to a mounting base, such as a pole or a plate on a side of a building. Some light poles includes a vertical section and a horizontal section. The horizontal section provides a surface or area for supporting a control module having a sensor for controlling the light fixture. However, some light poles only include a vertical pole, which does not include a convenient surface for mounting a control module. Electrical connection of the sensor to the light fixture can be difficult, such as when installing in the field and at the top of the light fixture.

A need remains for a device for mounting a light fixture control module to a light fixture.

BRIEF DESCRIPTION OF THE INVENTION

In one embodiment, a light fixture control module is provided and includes a base that includes an inner end and an outer end. The inner end is mounted to a vertical mounting base of a light fixture. The light fixture control module includes a bracket coupled to the outer end of the base. The bracket includes a shell that has an inner chamber. The light fixture control module includes a sensor mounted to the shell of the bracket. The sensor has a sensor element, a sensor wire transmitting a control signal from the sensor element, and a sensor connector connected to an end of the sensor wire. The sensor connector is configured to be electrically connected to a fixture wire of the light fixture to control operation of a light element of the light fixture.

In a further embodiment, a light fixture control module is provided and includes a base that includes an inner end and an outer end. The inner end is mounted to a vertical mounting base of a light fixture. The base includes a wire channel. The light fixture control module includes a bracket coupled to the outer end of the base. The bracket includes a shell that has an inner chamber. The light fixture control module includes a sensor mounted to the shell of the bracket. The sensor has a sensor element, a sensor wire transmitting a control signal from the sensor element, and a sensor connector connected to an end of the sensor wire. The sensor connector is configured to be electrically connected to a fixture wire of the light fixture to control operation of a light element of the light fixture. The wire channel is configured to receive one of the sensor wire of the fixture wire to allow connection between the sensor connector and the fixture wire.

In another embodiment, a light fixture control module is provided and includes a base that includes an inner end and an outer end. The inner end is mounted to a vertical mounting base of a light fixture. The light fixture control module includes a bracket coupled to the outer end of the base. The bracket includes a shell that has an inner chamber.

The bracket includes an end wall at an end of the inner chamber. The end wall facing the bracket. The light fixture control module includes a sensor mounted to the shell of the bracket. The sensor has a sensor element, a sensor wire transmitting a control signal from the sensor element, and a sensor connector connected to an end of the sensor wire. The sensor connector is mounted to the end wall of the bracket. The sensor connector has a mating end facing the base. The mating end forms a separable mating interface configured to be electrically connected to a fixture connector electrically connected to a fixture wire of the light fixture to control operation of a light element of the light fixture.

DETAILED DESCRIPTION OF THE INVENTION

Figure 1:
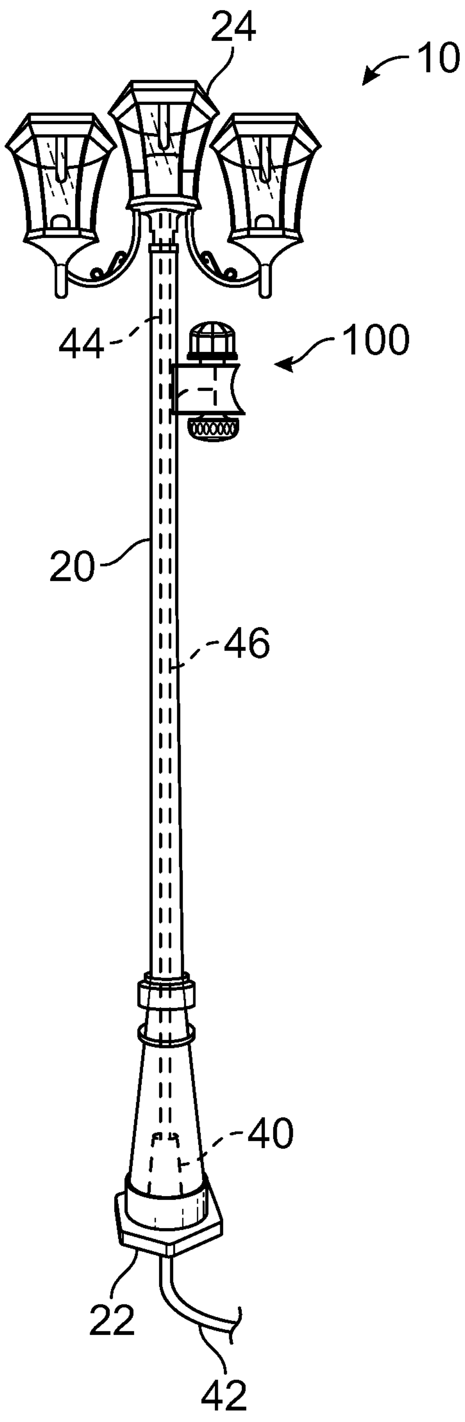
FIG. 1 illustrates a light fixture control module in accordance with an exemplary embodiment for controlling a light fixture.

FIG. 1 illustrates a light fixture control module 100 in accordance with an exemplary embodiment for controlling a light fixture 10. The light fixture control module 100 provides smart control of the light fixture 10. The light fixture control module 100 is mounted to the light fixture 10 to provide external control for the light fixture 10. The light fixture control module 100 is removable and replaceable. Components of the light fixture control module 100 are removable and replaceable, such as to repair or upgrade the light fixture control module 100. The light fixture control module 100 is modular in design to allow connection of different types of control options for the light fixture 10.

The light fixture 10 includes a pole 20 and one or more light elements 30 at the top of the pole 20. The pole 20 extends vertically between a base 22 at the bottom and a tip 24 at the top. The base 22 may be mounted to the ground. The light elements 30 are provided at or near the tip 24 of the pole 20. The pole 20 may include multiple sections between the bottom and the top of the pole 20. The light fixture control module 100 may be mounted to any of the sections of the pole 20. In the illustrated embodiment, the light fixture control module 100 is mounted to the pole 20 near the top of the pole 20. In various embodiments, the pole 20 may be generally cylindrical. Optionally, the pole 20 may be fluted. In various embodiments, the pole 20 may be tapered between the bottom and the top. For example, the bottom section may be larger (for example, larger diameter) in the top section may be smaller (for example, smaller diameter). Optionally, the wall of each section may be tapered. Alternatively, each section may be cylindrical, but have reduced diameters from the bottom to the top. The pole 20 may have decorative features along the pole 20 and/or at the tip 24 to support the light elements 30.

The light fixture 10 includes a control panel 40 (shown in phantom) which may be located in the interior of the pole 20 and accessed through an access panel (not shown). The control panel 40 controls operation of the light elements 30. For example, the control panel 40 may turn the light elements on and off. The control panel 40 may control a dimming function of the light elements 30. Power wires 42 are routed into the interior of the pole 20. The power wires 42 may be terminated to the control panel 40. Fixture wires 44 are provided in the light fixture 10, such as in the pole 20, to provide control signals and/or power to/from the control panel 40 to control operation of the light elements 30. In an exemplary embodiment, the fixture wires 44 are routed through the hollow interior of the pole 20 between the light fixture control module 100 and the control panel 40. The fixture wires 44 send signals from the light fixture control module 100 to the control panel 40 to control operation of the light fixture 10. For example, the fixture wires 44 may send photo signals from a photosensor of the light fixture control module 100 to turn the light elements 30 on or off at dusk and dawn based on the light levels in the environment around the light fixture 10. The fixture wires 44 may send motion signals from a motion detector of the light fixture control module 100 to increase the light output of the light elements 30 when motion is detected. Other types of sensors at the light fixture control module may send other types of signals for other control schemes.

While the light fixture 10 is shown as a freestanding lamp, the light fixture control module 100 may be used with other types of light fixtures in alternative embodiments. For example, the light fixture control module 100 may be used with light fixtures mounted to a building. For example, the light fixture control module 100 may be mounted to a mounting plate or other structure on the side of the building at the light fixture to control such light fixture.

Figure 2:
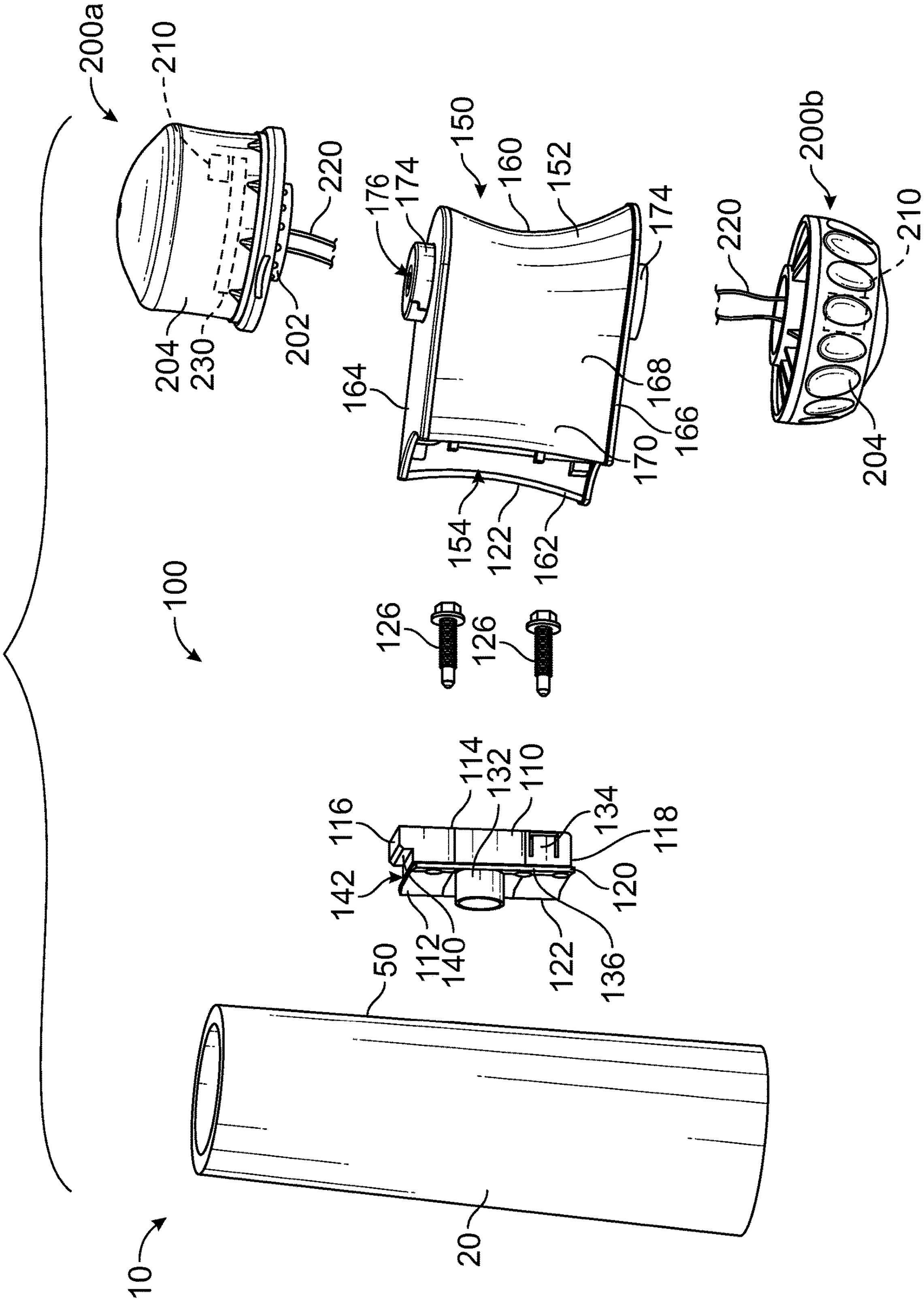
FIG. 2 is a rear perspective, exploded view of the light fixture control module in accordance with an exemplary embodiment configured to be mounted to a vertical mounting base of the light fixture.
Figure 3:
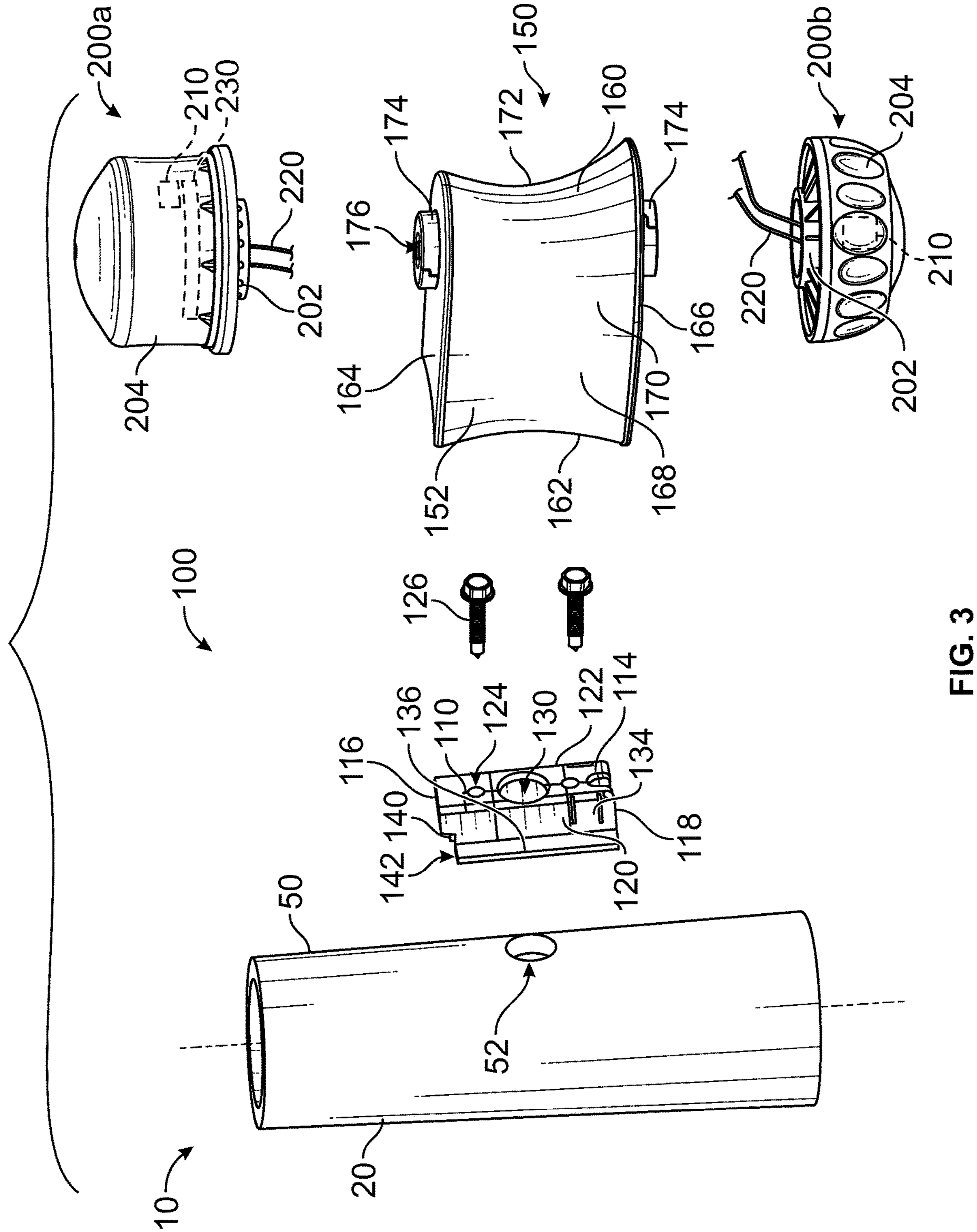
FIG. 3 is a front perspective, exploded view of the light fixture control module in accordance with an exemplary embodiment configured to be mounted to the vertical mounting base of the light fixture.

FIG. 2 is a rear perspective, exploded view of the light fixture control module 100 in accordance with an exemplary embodiment configured to be mounted to a vertical mounting base 50 of the light fixture 10. FIG. 3 is a front perspective, exploded view of the light fixture control module 100 in accordance with an exemplary embodiment configured to be mounted to the vertical mounting base 50 of the light fixture 10. In the illustrated embodiment, the vertical mounting base 50 is a portion of the pole 20 of the light fixture 10. The light fixture control module 100 may be mounted to other types of vertical mounting bases in alternative embodiments.

In an exemplary embodiment, the light fixture control module 100 includes a base 110 and a bracket 150 separate from the base 110 and configured to be mounted to the base 110. The base 110 is configured to be mounted directly to the vertical mounting base 50. The bracket 150 may surround and hide the base 110 from view. The bracket 150 is used to support one or more sensors 200, which are used to control the light fixture 10. Optionally, the base 110 may be a universal component configured to receive various different brackets 150 having different sensor configurations. For example, the base 110 may be used to support the dual sensor bracket illustrated in FIGS. 2 and 3. The base 110 may be used to support a top sensor bracket having a single sensor at the top of the bracket or a bottom sensor bracket having a single sensor at the bottom of the bracket. The base 110 may be used to support other types of brackets, such as sides sensor brackets having the sensors 200 at one or more sides of the bracket or a front sensor bracket having the sensor at the front of the bracket. The base 110 may be used to support brackets having the same or similar mounting interfaces but having different overall sizes or shapes. For example, various brackets may be designed having different decorative shapes or features to correspond to the style of the pole 20.

In an exemplary embodiment, the base 110 is a molded plastic part. However, other types of bases may be used in alternative embodiments, such as a formed metal base. The base 110 includes an inner end 112 and an outer end 114. The inner end 112 faces the vertical mounting base 50. Optionally, the inner end 112 may be sealed to the vertical mounting base 50. The base 110 extends between a top 116 and a bottom 118. The base 110 includes opposite sides 120, 122 extending between the top 116 and the bottom 118. Optionally, the base 110 may be generally box shaped. However, the base 110 may have other shapes in alternative embodiments. In an exemplary embodiment, the inner end 112 may be curved, such as to generally match curvature of the vertical mounting base 50 (for example, the pole 20).

The base 110 includes one or more openings 124 that receive mounting elements 126 used to mount the base 110 to the vertical mounting base 50. In the illustrated embodiment, the mounting elements 126 are threaded fasteners configured to be threadably coupled to the vertical mounting base 50. For example, the threaded fasteners may be self-tapping screws. Other types of mounting elements may be used in alternative embodiments. For example, the mounting elements may be straps or bands used to wrap around the outside of the vertical mounting base 50 rather than screw into the vertical mounting base 50.

In an exemplary embodiment, the base 110 includes a wire channel 130 extending through the base 110. The wire channel 130 is configured to receive one or more wires, such as from the sensors 200. In various embodiments, the wire channel 130 passes through the base 110 from the outer end 114 to the inner end 112, such as to allow routing of the wires into the hollow interior of the pole 20. In other embodiments, the wire channel 130 may extend into another portion of the base 110, such as to the bottom 118 to allow the wires to exit to the exterior of the base 110. In an exemplary embodiment, the base 110 includes a grommet 132 extending from the inner end 112. The wire channel 130 passes through the grommet 132. The grommet 132 is configured to be plugged into an opening 52 in the vertical mounting base 50. The grommet 132 directs the wires through the opening 52, such as into the hollow interior of the pole 20. The grommet 132 may protect the wires from the sharp edge of the vertical mounting base 50 at the opening 52. Optionally, the grommet 132 may be sealed to the vertical mounting base 50.

In an exemplary embodiment, the base 110 includes latching features 134 configured to be latchably coupled to the bracket 150. In the illustrated embodiment, the latching features 134 are deflectable latches. In other various embodiments, the latching features 134 may be catches configured to be connected to corresponding deflectable latches of the bracket 150. In the illustrated embodiment, the latching features 134 are located along the sides 120, 122, such as proximate to the bottom 118. Other locations are possible in alternative embodiments. Other types of securing means may be used in alternative embodiments to secure the bracket 150 to the base 110.

In an exemplary embodiment, the base 110 includes one or more mounting flanges 136 configured to be mounted to the vertical mounting base 50. In the illustrated embodiment, the mounting flanges 136 extend along the sides 120, 122. The mounting flanges 136 are provided at the inner end 112 to interface with the vertical mounting base 50. In an exemplary embodiment, the mounting flanges 136 may be deflectable to change shape and to conform to the vertical mounting base 50 when mounted thereto. For example, the mounting flanges 136 may be flexed outward when the mounting elements 126 secure the base 110 to the vertical mounting base 50. The mounting flanges 136 allows mounting of the base 110 to different sized and shaped poles 20. For example, the mounting flanges 136 allows mounting of the base 110 to poles 20 having different diameters by conforming to the different radius of curvature of the different poles 20.

In an exemplary embodiment, the base 110 includes a retention shoulder 140 forming a pocket 142. In the illustrated embodiment, the retention shoulder 140 is located at the top 116 of the base 110. The retention shoulder 140 is located outward of the pocket 142. For example, the pocket 142 is located between the retention shoulder 140 and the inner end 112. The pocket 142 is configured to receive a portion of the bracket 150. For example, a portion of the bracket 150 may be loaded into the pocket 142 from above. The retention shoulder 140 retains the bracket 150 in the pocket 142.

The bracket 150 is configured to be coupled to the outer end 114 of the base 110. The bracket 150 includes a shell 152 having an inner chamber 154. The bracket 150 is plugged onto the base 110 such that the base 110 is received in the inner chamber 154. In an exemplary embodiment, the bracket 150 is a molded plastic part. However, the bracket 150 may be manufactured from different materials or manufactured by different processes in alternative embodiments. For example, the bracket 150 may be an additive manufactured part, such as being 3D printed. The bracket 150 may be a stamped and formed metal part in other various embodiments.

The bracket 150 has a front 160 and a rear 162. The rear 162 is configured to be coupled to the base 110. The bracket 150 includes a top 164 and a bottom 166. The bracket 150 includes opposite sides 170, 172 extending between the top 164 and the bottom 166. Optionally, the bracket 150 may include a continuous side wall 168 extending along the sides 170, 172 and the front 160. The side wall 168 may have a curvature, such as being concave between the top 164 and the bottom 166. The top 164 and/or the bottom 166 may be generally flat or planar. In other embodiments, the top 164 and/or the bottom 166 may be curved, such as having a convex shape. The bracket 150 may be open at the rear 162 between the sides 170, 172, such as to receive the base 110. Optionally, the top 164 and/or the bottom 166, at the rear 162, may be shaped to conform to the vertical mounting base 50 (for example, the pole 20). For example, at the rear 162, at the top 164 and the bottom 166, may be curved, such as having a radius of curvature to match the radius of curvature of the pole 20.

In an exemplary embodiment, the bracket 150 includes one or more mounting hubs 174 for mounting the sensor(s) 200 to the bracket 150. In the illustrated embodiment, the mounting hubs 174 are provided at the top 164 and the bottom 166. Other locations are possible in alternative embodiments. Greater or fewer mounting hubs 174 may be provided in alternative embodiments. Optionally, multiple mounting hubs 174 may be provided on the same wall of the bracket 150, such as the top 164 and/or the bottom 166. In various embodiments, the mounting hubs 174 may extend from or stand proud of the corresponding wall of the bracket 150. In other embodiments, the mounting hubs 174 may extend into or be recessed into the corresponding wall of the bracket 150. In an exemplary embodiment, the mounting hub 174 is circular. The sensor 200 is configured to be rotatably coupled to the mounting hub 174. For example, the mounting hub 174 may include threads or a bayonet style connection element for connecting the sensor 200 to the mounting hub 174. The mounting hub 174 may have other shapes in alternative embodiments. The sensor 200 may be secured to the mounting hub 174 by other means in alternative embodiments, such as using latches, clips, fasteners, and the like.

In various embodiments, each mounting hub 174 is a mechanical connection point for connecting the sensor 200 to the bracket 150. The mounting hub 174 includes an opening 176 to allow sensor wires or other components to pass through the mounting hub 174. However, in alternative embodiments, the mounting hub 174 includes an electrical connector, such as a twist lock electrical connector. The electrical connector includes contacts or wireless transmitters to transfer data and/or power between the bracket 150 and the sensor 200.

In an exemplary embodiment, each sensor 200 is configured to be removably coupled to the corresponding mounting hub 174. The sensor 200 is used to monitor an environmental characteristic around the light fixture control module 100. For example, the sensor 200 may be used to monitor an amount of ambient light around the light fixture control module 100 to control turning the light fixture 10 on and off, such as at dusk and dawn. The sensor 200 may be used to detect motion around the light fixture control module 100, such as to brighten the light fixture 10 when motion is detected. The sensor may be used to detect audible sounds, such as an alarm, to flicker or strobe during an emergency situation. Other types of sensors may be provided in alternative embodiments.

In an exemplary embodiment, each sensor includes a sensor hub 202 configured to be mounted to the mounting hub 174. In various embodiments, a sensor seal may be provided between the sensor 200 and the bracket 150, such as to seal at the sensor hub 202 and the mounting hub 174. The sensor hub 202 may be threaded or include a bayonet style connecting element. In alternative embodiments, the sensor hub 202 may include latches, clips or include an opening configured to receive a fastener. The sensor 200 includes a sensor cover 204 enclosing a space. The sensor 200 includes a sensor element 210 located in the space and surrounded by the sensor cover 204. Various types of sensor elements may be utilized. For example, the sensor element 210 may be a photodetector, a motion detector, a sound detector, a gas detector, or another type of detector. Optionally, the sensor 200 may include multiple sensor elements 210. The sensor 200 includes one or more sensor wires 220 coupled to the sensor element 210. Signals, based on input from the sensor element 210, may be transmitted along the sensor wires 220, such as to the control panel 40 (shown in FIG. 1) of the light fixture 10. In various embodiments, the sensor wires 220 are directly coupled to the sensor element 210. In other various embodiments, the sensor 200 may include a circuit board 230 or other electronic components with the sensor element 210 and the sensor wires 220 coupled to the circuit board 230. The circuit board 230 may process the signals from the sensor element 210 prior to transmitting signals on the sensor wires 220. For example, the circuit board 230 may generate control signals transmitted along the sensor wires 220 to the control panel 40.

In the illustrated embodiment, the sensors 200 include an upper sensor 200*a* and a lower sensor 200*b*. The upper sensor 200*a* may be a photosensor used to detect ambient light around the light fixture control module 100. The lower sensor 200*b* may be a motion detector used to detect motion around the light fixture control module 100. The upper sensor 200*a* and/or the lower sensor 200*b* may be other types of detectors in alternative embodiments.

Figure 4:
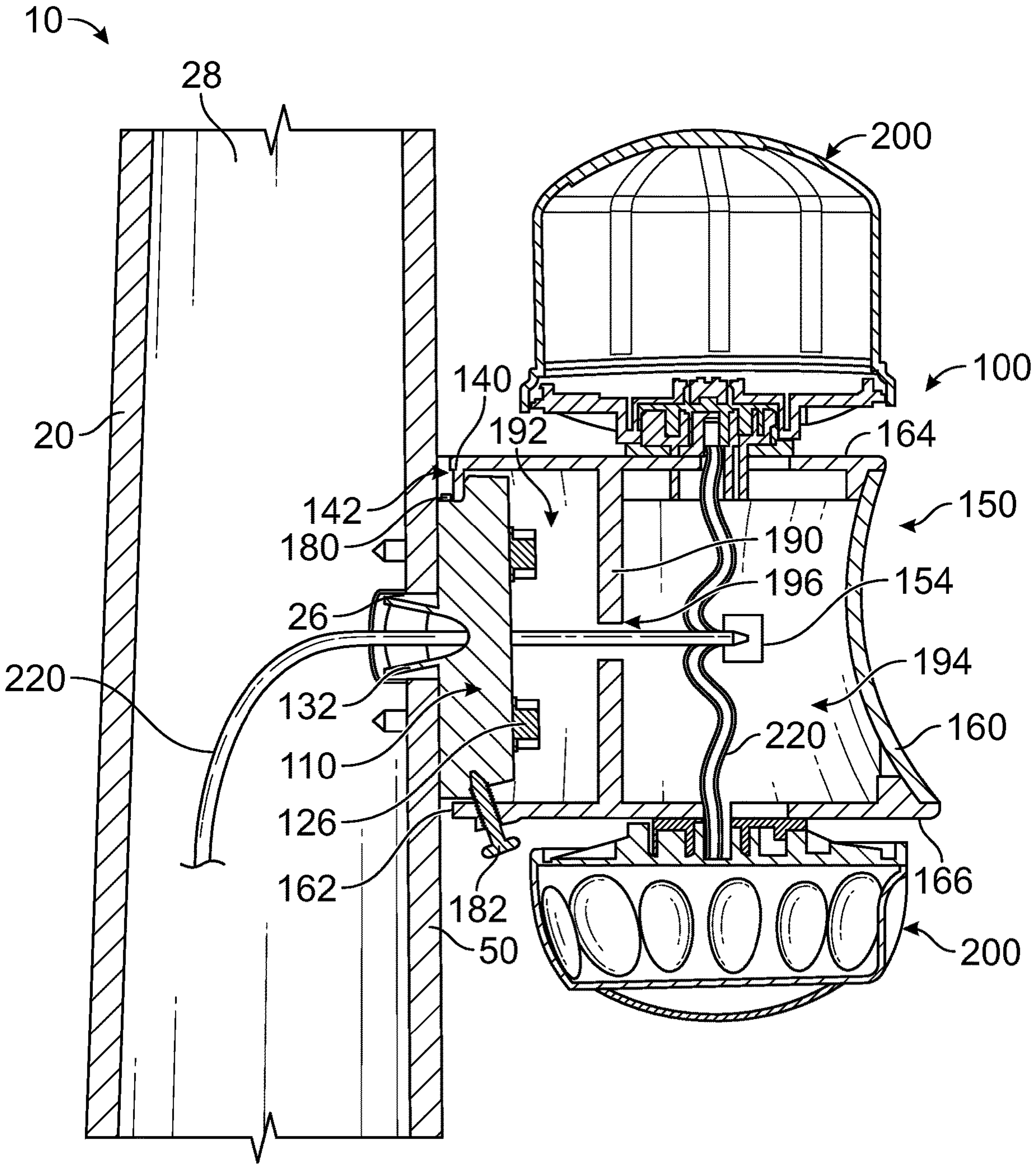
FIG. 4 is a cross-sectional view of the light fixture control module showing the light fixture control module mounted to the vertical mounting base of the light fixture in accordance with an exemplary embodiment.

FIG. 4 is a cross-sectional view of the light fixture control module 100 showing the light fixture control module 100 mounted to the vertical mounting base 50 of the light fixture 10. In the illustrated embodiment, the vertical mounting base 50 is defined by the pole 20 of the light fixture 10. The light fixture control module 100 extends along the sides of the pole 20. The light fixture control module 100 is connected to the pole 20 from the exterior of the pole 20.

The base 110 is mounted to the vertical mounting base 50 using the mounting elements 126. In the illustrated embodiment, the mounting elements 126 are threaded fasteners. The threaded fasteners may be screwed directly into the pole 20. In an exemplary embodiment, the grommet 132 passes through an opening 26 in the vertical mounting base 50. The opening 26 may be formed by drilling a hole in the side of the pole 20. The grommet 132 extends into a hollow interior 28 of the pole 20.

The bracket 150 is coupled to the base 110. In an exemplary embodiment, the bracket 150 includes a retention tab 180 extending into the inner chamber 154. The retention tab 180 is received in the pocket 142. The retention tab 180 interfaces with the retention shoulder 140 to secure the bracket 150 to the base 110. In an exemplary embodiment, the retention tab 180 is configured to be pivotably coupled to the retention shoulder 140 in the pocket 142. For example, the retention tab 180 may pivoted in the pocket 142 during mounting of the bracket 150 to the base 110. In the illustrated embodiment, the retention tab 180 is provided at the top 164 of the bracket 150. Other locations are possible in alternative embodiments. In an exemplary embodiment, the bottom 166 of the bracket 150 is secured to the base 110 using a securing member 182. The securing member 182 may be a threaded fastener, such as a screw. Other securing means may be used in alternative embodiments, such as latches, clips, and the like.

In an exemplary embodiment, the bracket 150 includes a end wall 190 in the inner chamber 154. The end wall 190 divides the inner chamber 154 into a mounting cavity 192 and a wire cavity 194. In the illustrated embodiment, the mounting cavity 192 is provided at the rear 162 and the wire cavity 194 is provided at the front 160. The mounting cavity 192 receives the base 110. For example, the mounting cavity 192 may be sized and shaped to surround the base 110. The wire cavity 194 receives the sensor wires 220. The wire cavity 194 may receive portions of the sensors 200. The wire cavity 194 may be large enough to accommodate pigtail connections, such as between the sensor wires 220 extending from the sensors 200 and an additional wire configured to be routed into the hollow interior 28 of the pole 20. In an exemplary embodiment, the end wall 190 includes an opening 196 to allow the sensor wires 220 to pass through the end wall 190. Additional end walls 190 may be provided in alternative embodiments to form additional cavities.

Figure 5:
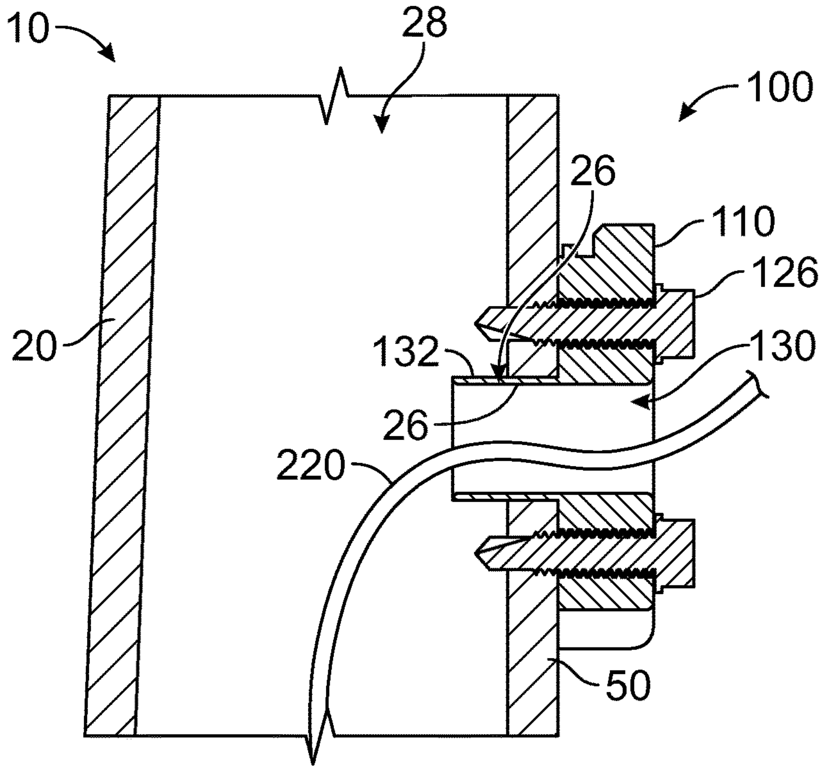
FIG. 5 is a cross-sectional view of the light fixture control module showing the base mounted to the vertical mounting base of the light fixture in accordance with an exemplary embodiment.

FIG. 5 is a cross-sectional view of the light fixture control module 100 showing the base 110 mounted to the vertical mounting base 50 of the light fixture 10. The base 110 is mounted to the vertical mounting base 50 using the mounting elements 126 (for example, threaded fasteners). The grommet 132 passes through the opening 26 in the vertical mounting base 50. The sensor wires 220 pass through the wire channel 130. The wire channel 130 extends through the grommet 132 to allow the sensor wires 220 to be routed into the hollow interior 28 of the pole 20. In an exemplary embodiment, the distal end of the grommet 132 is located away from the side wall of the pole 20 in the hollow interior 28 of the pole 20. The grommet 132 is used to protect the sensor wires 220, such as to prevent cutting or slicing of the sensor wire 220 at the sharp edge defining the opening 26. The distal end of the grommet 132 may have a smooth edge to prevent cutting of the sensor wires 220. For example, the grommet 132 may be chamfered or curved at the distal end of the grommet 132.

Figure 6:
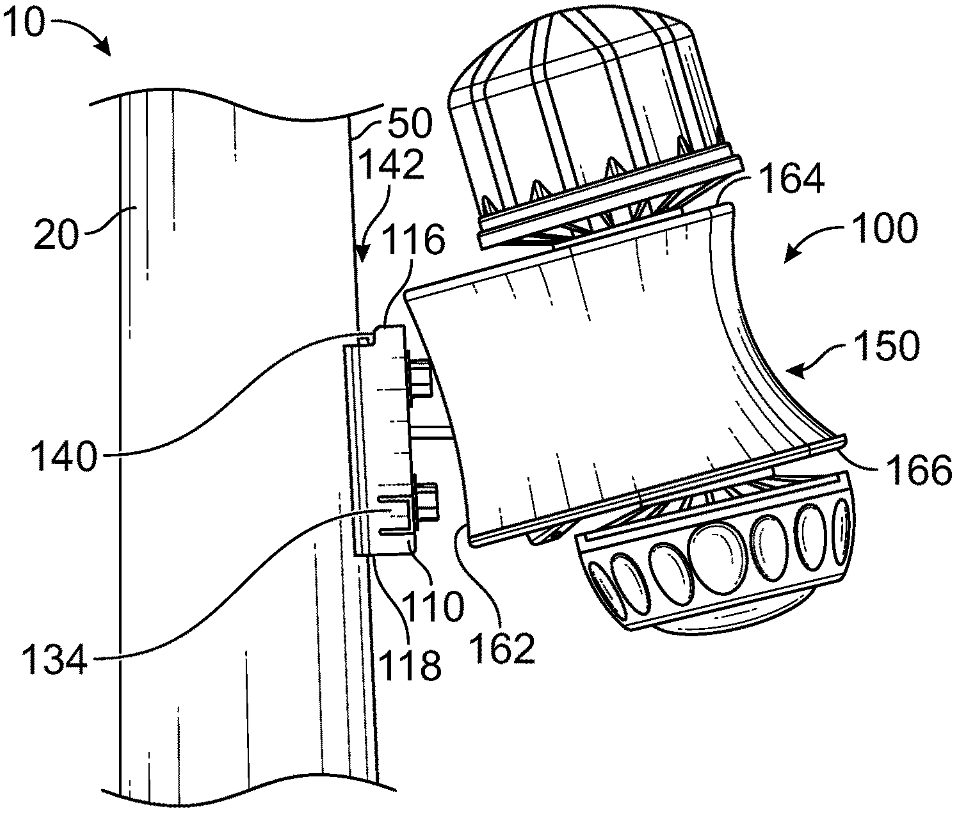
FIG. 6 is a side view of the light fixture control module showing the bracket poised for mounting to the base in accordance with an exemplary embodiment.

FIG. 6 is a side view of the light fixture control module 100 showing the bracket 150 poised for mounting to the base 110. The base 110 is shown coupled to the vertical mounting base 50 of the light fixture 10. In an exemplary embodiment, the base 110 forms a pivot mount for mounting the bracket 150 to the vertical mounting base 50. During assembly, the retention tab 180 at the top 164 of the bracket 150 is loaded over the top 116 of the base 110 into the pocket 142. The bracket 150 is held at an angle during assembly and loading of the retention tab 180 into the pocket 142. Once the retention tab 180 is received in the pocket 142, the bottom 166 of the bracket 150 may be pivoted inward toward the pole 20 to seat the rear 162 of the bracket 150 on the base 110 and/or the pole 20. In an exemplary embodiment, the base 110 includes the latching features 134 at the bottom 118 of the base 110, which are used to latchably secure the bottom 166 of the bracket 150 to the base 110. Other mounting schemes may be used in alternative embodiments to mount the bracket 150 to the base 110.

Figure 7:
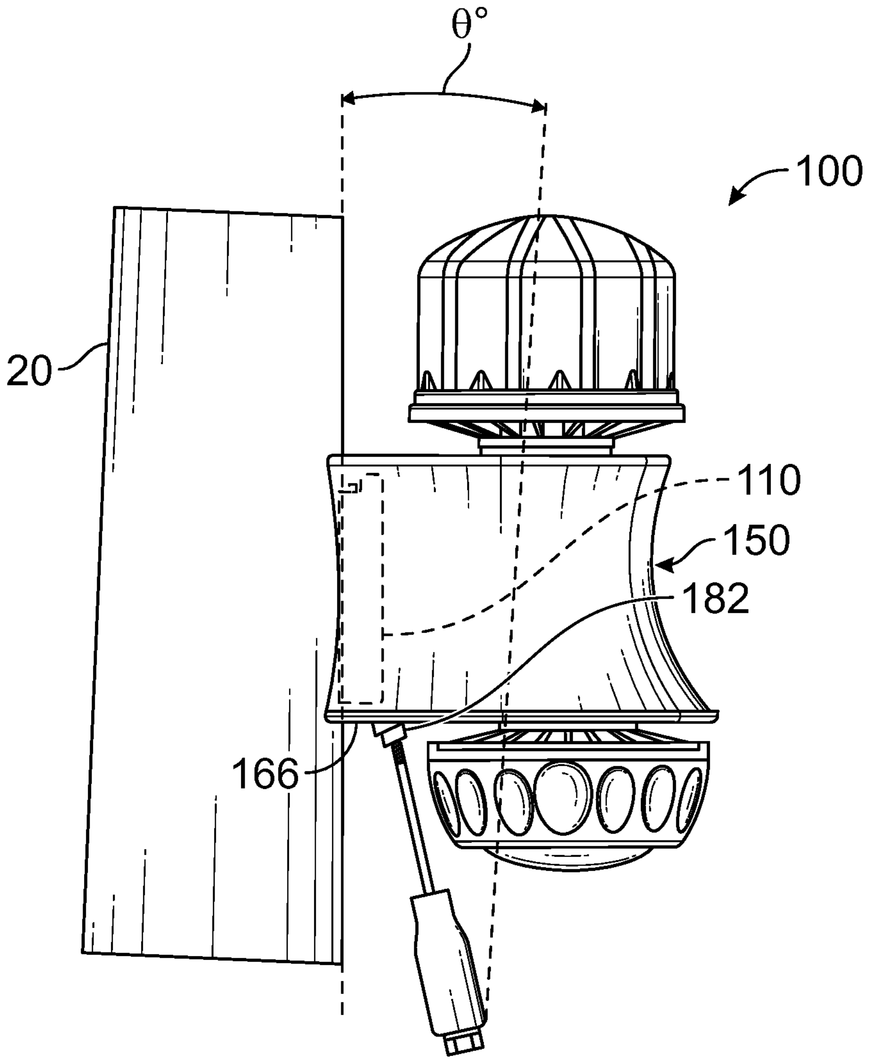
FIG. 7 is a side view of the light fixture control module showing the bracket mounted to the base in accordance with an exemplary embodiment.

FIG. 7 is a side view of the light fixture control module 100 showing the bracket 150 mounted to the base 110. In an exemplary embodiment, the bracket 150 includes a leveling feature to allow leveling of the bracket 150 relative to the base 110 and the pole 20. For example, when the pole 20 is tapered, the side wall of the pole 20 is at an angle relative to vertical. The leveling feature of the bracket 150 allows mounting of the bracket 150 horizontally to the tapered pole 20. In an exemplary embodiment, the securing member 182 is used as a leveling feature. For example, the securing member 182 is configured to be coupled to the base 110 at different mounting positions to control a mounting orientation (for example, angle) of the bracket 150 relative to the base 110 at one of various different mounting orientations corresponding to the different mounting positions. For example, the bottom 166 of the bracket 150 may be pivoted toward the pole 20 or away from the pole 20 until the bracket 150 is at the desired mounting orientation (for example, horizontal or level). The securing member 182 is connected to the base 110 when the bracket 150 is at the desired mounting orientation. For example, the securing member 182 may be screwed into the base 110 at the mounting position corresponding to the desired mounting orientation.

Figure 8:
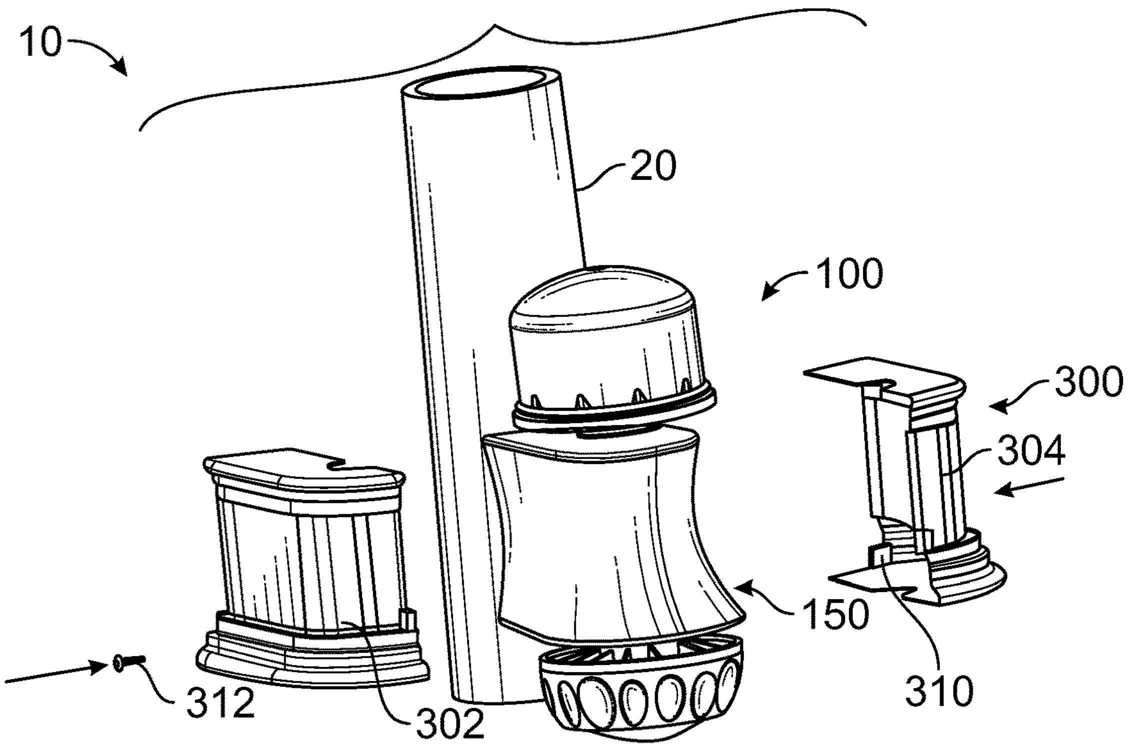
FIG. 8 is an exploded view of the light fixture control module in accordance with an exemplary embodiment.
Figure 9:
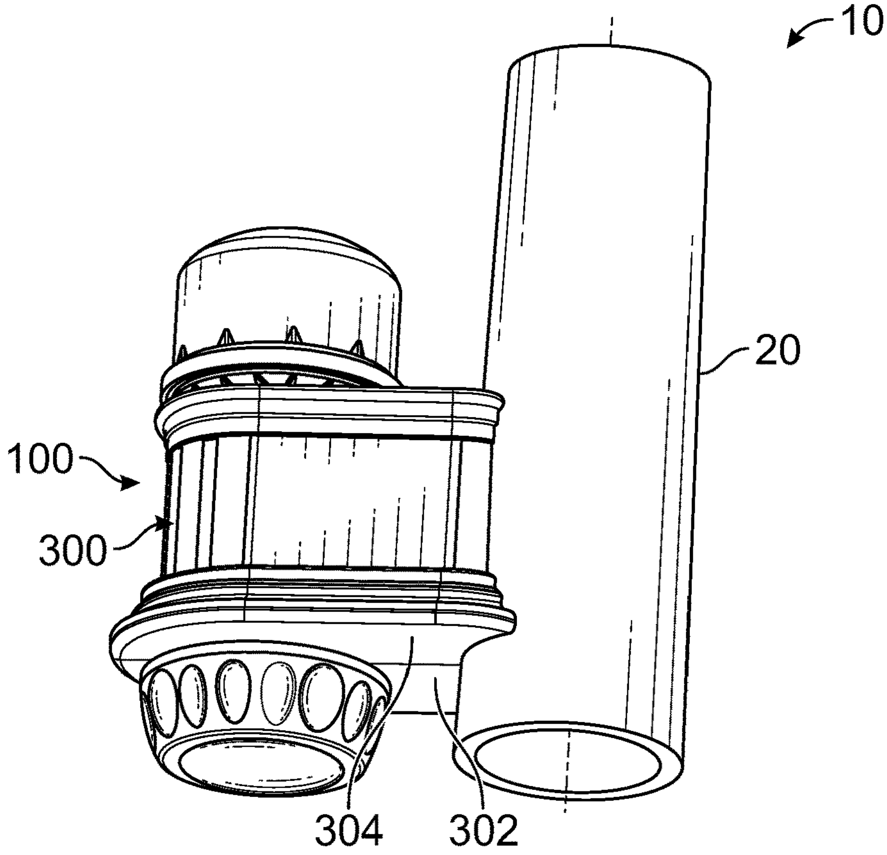
FIG. 9 is an assembled view of the light fixture control module in accordance with an exemplary embodiment.

FIG. 8 is an exploded view of the light fixture control module 100 in accordance with an exemplary embodiment. FIG. 9 is an assembled view of the light fixture control module 100 in accordance with an exemplary embodiment. FIGS. 8 and 9 illustrate a decorative cover 300 configured to be coupled to the bracket 150. In the illustrated embodiment, the decorative cover 300 is a multipiece structure including a first portion 302 configured to be joined to a second portion 304. Optionally, the first and second portions 302, 304 may be mirrored halves. The first portion 302 is provided at the right side of the bracket 150 and the second portion 304 is provided at the left side of the bracket 150. The decorative cover 300 forms a skin surrounding the bracket 150. The decorative cover 300 includes decorative features to provide visual appeal for the light fixture control module 100, which may be complementary to the style of the light fixture 10.

The decorative cover 300 includes a mounting tab 310, which may be coupled to the bracket 150 to position the decorative cover 300 relative to the bracket 150. The mounting tabs 310 may be located at the rear of the decorative cover 300 and configured to be located between the bracket 150 and the pole 20. The decorative cover 300 includes a fastener 312 used to secure the first portion 302 and the second portion 304. Optionally, the rear of the decorative cover 300 may closely match the curvature of the pole 20 to reduce or eliminate gaps between the decorative cover 300 and the pole 20 for a clean finished look.

Figure 10:
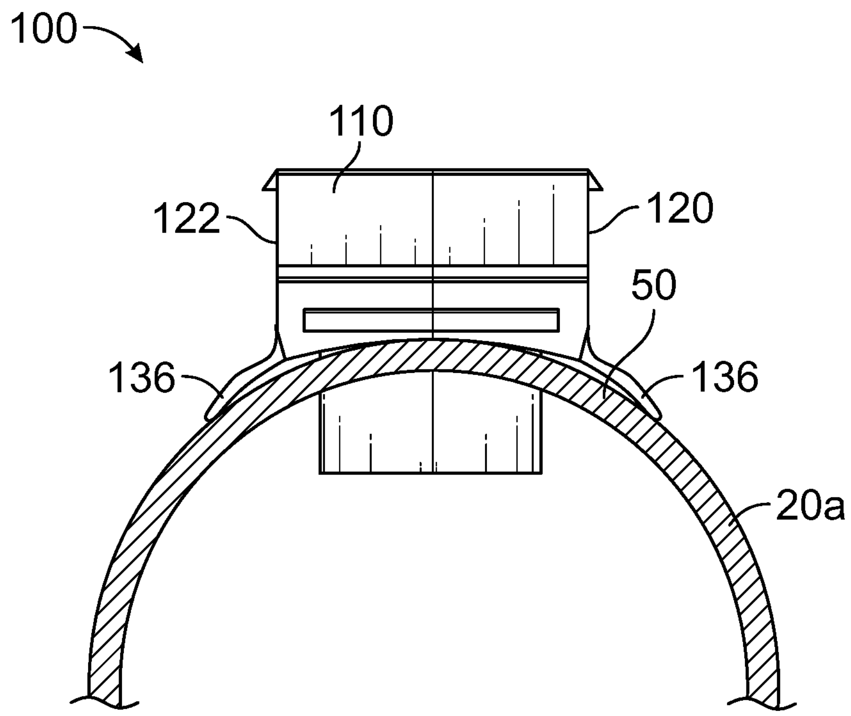
FIG. 10 is a top view of the base of the light fixture control module mounted to the pole in accordance with an exemplary embodiment.
Figure 11:
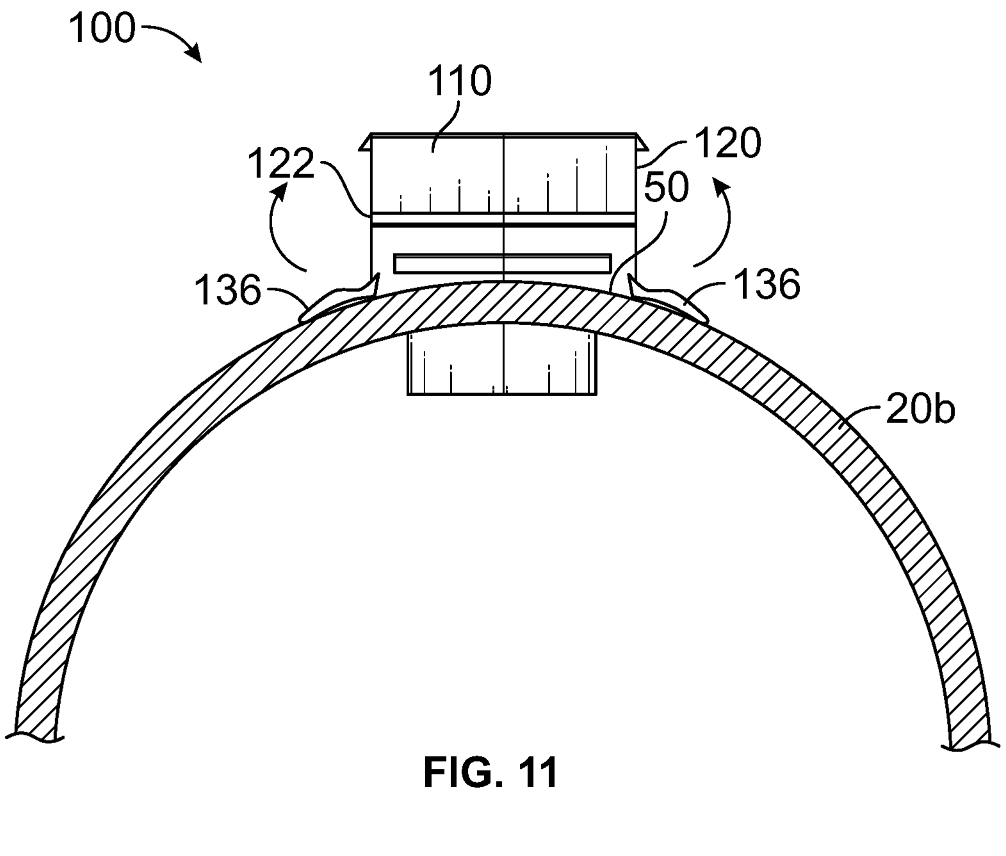
FIG. 11 is a top view of the base of the light fixture control module mounted to the pole in accordance with an exemplary embodiment.

FIG. 10 is a top view of the base 110 of the light fixture control module 100 mounted to the pole 20*a* in accordance with an exemplary embodiment. FIG. 11 is a top view of the base 110 of the light fixture control module 100 mounted to the pole 20*b* in accordance with an exemplary embodiment. The pole 20*a* shown in FIG. 10 is a smaller diameter compared to the pole 20*b* shown in FIG. 11. The same base 110 may be mounted to the different diameter poles 20*a*, 20*b*.

In an exemplary embodiment, the base 110 includes the mounting flanges 136 along the sides 120, 122. The mounting flanges 136 interface with the poles 20*a*, 20*b* (for example, the vertical mounting base 50). The mounting flanges 136 are deflectable to change shape and to conform to the shape of the pole 20*a*, 20*b*. For example, the mounting flanges 136 may be flexed outward when the base 110 is mounted to the vertical mounting base 50. The mounting flanges 136 conform to the different radius of curvature of the different poles 20*a*, 20*b* to allow mounting of the base 110 to the different diameter poles 20*a*, 20*b*.

Figure 12:
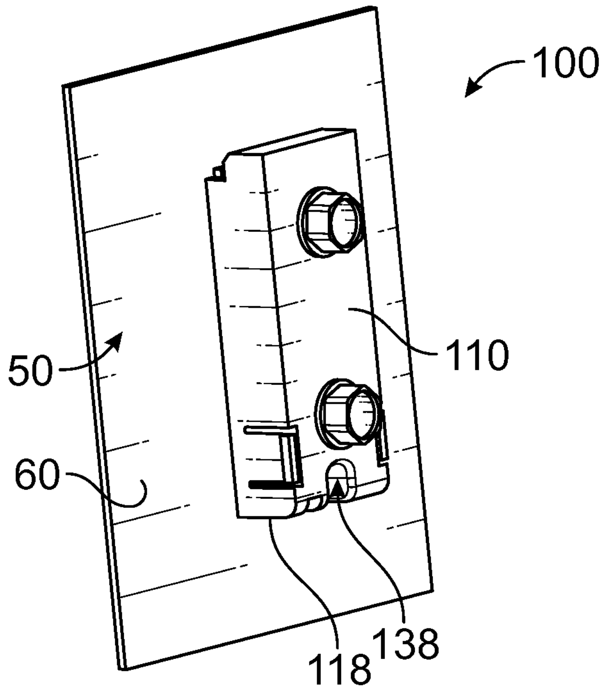
FIG. 12 is a front perspective view of the base of the light fixture control module mounted to the vertical mounting base in accordance with an exemplary embodiment.
Figure 13:
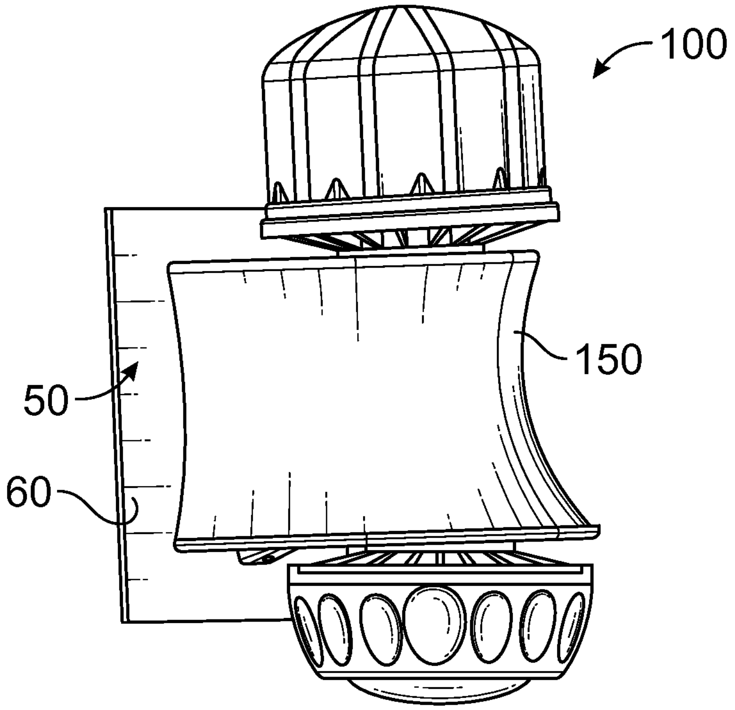
FIG. 13 is a front perspective view of the light fixture control module mounted to the vertical mounting base in accordance with an exemplary embodiment.

FIG. 12 is a front perspective view of the base 110 of the light fixture control module 100 mounted to the vertical mounting base 50 in accordance with an exemplary embodiment. FIG. 13 is a front perspective view of the light fixture control module 100 mounted to the vertical mounting base 50 in accordance with an exemplary embodiment. The vertical mounting base 50 shown in FIGS. 12 and 13 is planar or flat rather than being the cylindrical pole 20 (shown in FIG. 1). The vertical mounting base 50 includes a mounting plate 60, which may be mounted to the side of a building. The mounting plate 60 is planar. Optionally, the sensor wires 220 may be routed into the interior of the building through the vertical mounting base 50. Alternatively, the sensor wires 220 may be routed along the exterior of the building by exiting the base 110 through an opening 138 at the bottom 118.

Figure 14:
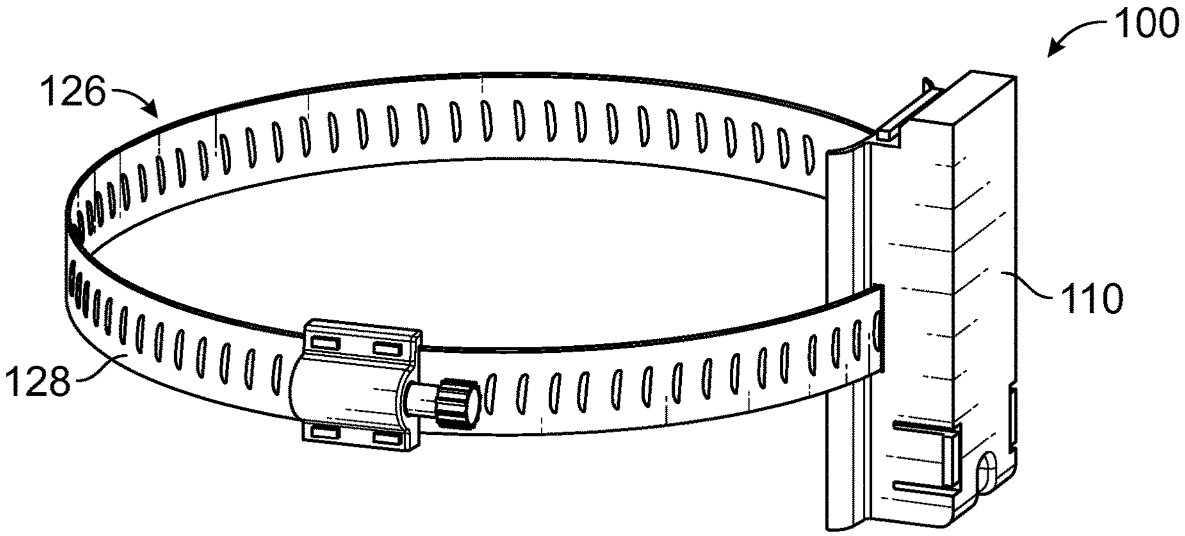
FIG. 14 is a front perspective view of the base of the light fixture control module in accordance with an exemplary embodiment.
Figure 15:
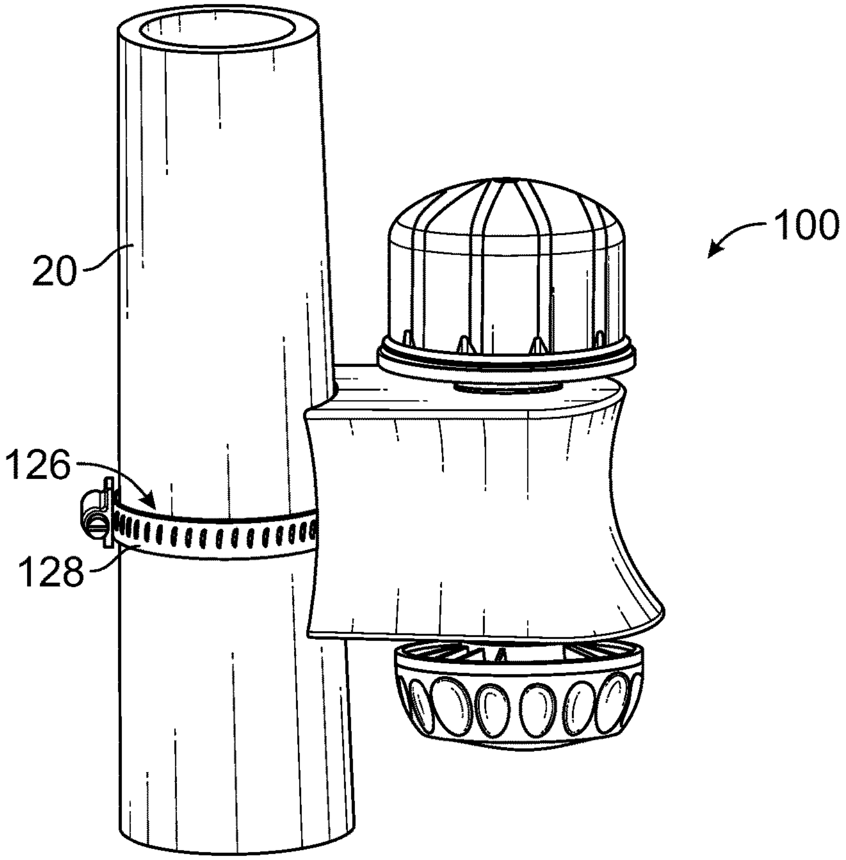
FIG. 15 is a perspective view of the light fixture control module mounted to the pole in accordance with an exemplary embodiment.

FIG. 14 is a front perspective view of the base 110 of the light fixture control module 100 in accordance with an exemplary embodiment. FIG. 15 is a perspective view of the light fixture control module 100 mounted to the pole 20 in accordance with an exemplary embodiment. FIGS. 14 and 15 illustrate the mounting element 126 of the base 110 including a band clamp 128 configured to be wrapped around the pole 20 and tightened to secure the base 110 to the pole 20. The band clamp 128 may include a worm drive to tighten the band clamp 128.

Figure 16:
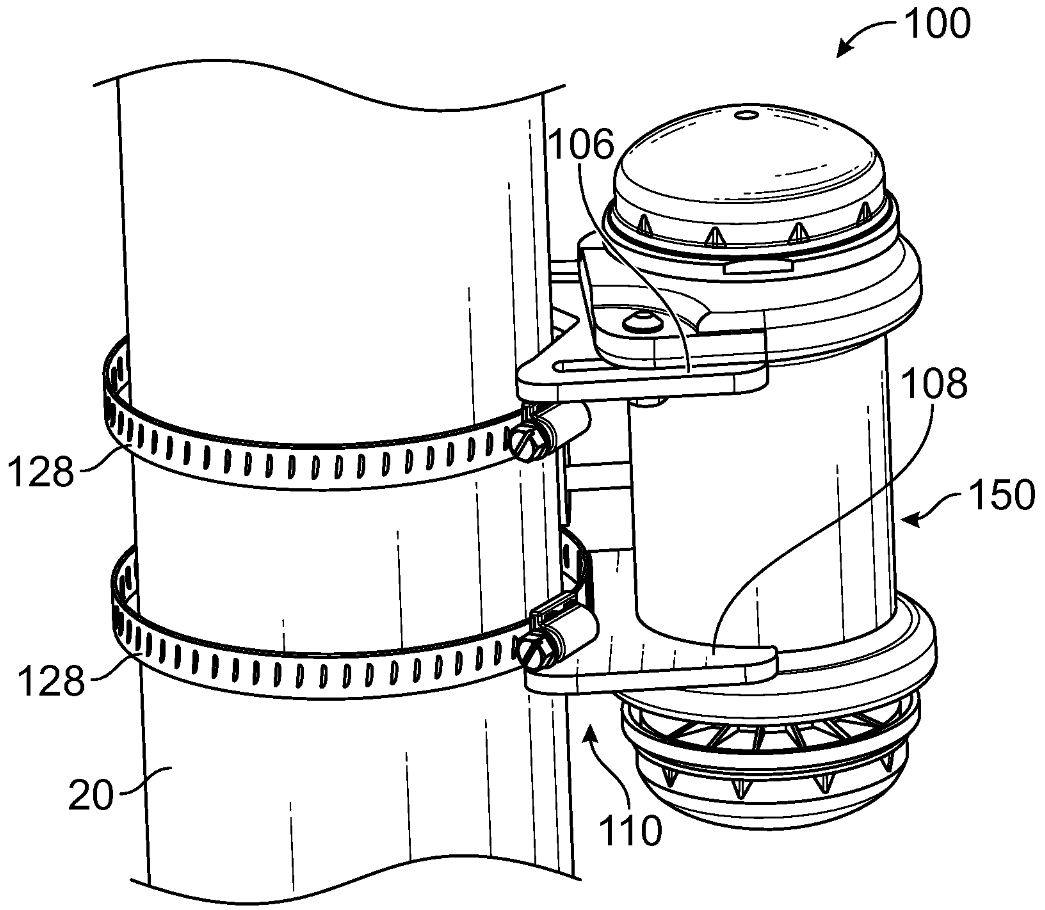
FIG. 16 is a perspective view of the light fixture control module mounted to the pole in accordance with an exemplary embodiment.

FIG. 16 is a perspective view of the light fixture control module 100 mounted to the pole 20 in accordance with an exemplary embodiment. In the illustrated embodiment, the base 110 includes a pair of the band clamps 128. In the illustrated embodiment, the base 110 is a multipiece base having an upper base support 106 and a lower base support 108 separate and discrete from each other and mounted to the pole 20 using the corresponding band clamps 128. The upper base support 106 supports the top of the bracket 150. The lower base support 108 supports the bottom of the bracket 150. The bracket 150 is shaped differently, such as being an enclosed canister. The base 110 and/or the bracket 150 may have other shapes or sizes in alternative embodiments.

FIG. 17-29 illustrate connection assemblies 400 for the light fixture control module 100 in accordance with exemplary embodiments. Components of the exemplary embodiments may be interchangeable and utilized in other embodiments. Like components are identified with like reference numerals. In an exemplary embodiment, the connection assemblies 400 include a sensor connector 410 configured to be connected to an end(s) of the sensor wire(s) 220. The sensor connector 410 is configured to be electrically connected to the fixture wire(s) 44 to control operation of the light element of the light fixture 10. In various embodiments, the connection assemblies 400 may include a fixture wire assembly 70 and/or a fixture connector configured to be mated with the sensor connector 410. The fixture connector is connected to the end(s) of the fixture wire(s) 44 to mate with the sensor connector 410. For example, the sensor connector 410 and the fixture connector may be a plug connector and a receptacle connector, or vice versa.

Figure 17:
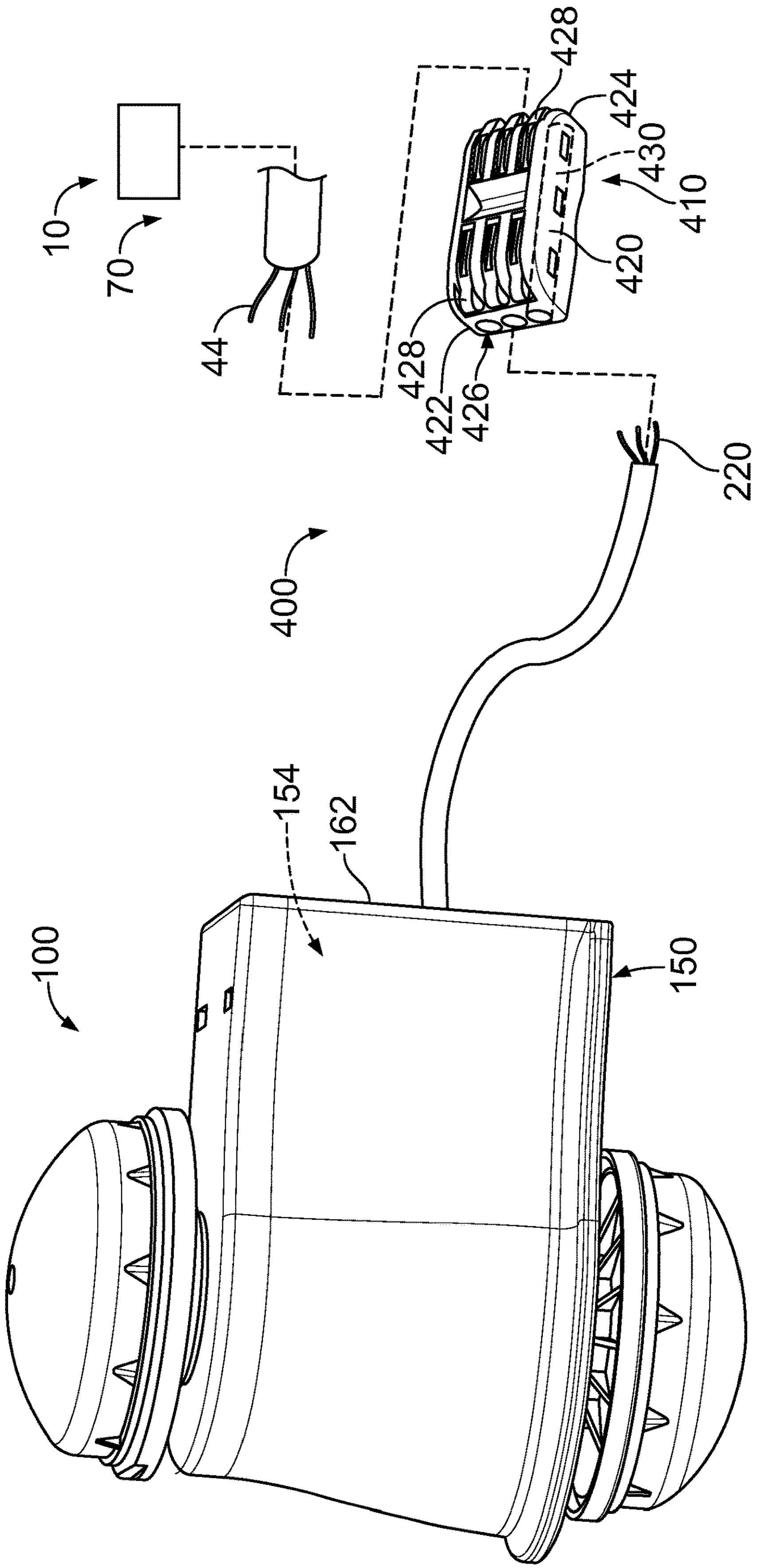
FIG. 17 illustrates the light fixture control module with an embodiment of the connection assembly in accordance with an exemplary embodiment.

FIG. 17 illustrates the light fixture control module 100 with an embodiment of the connection assembly 400. In an exemplary embodiment, the sensor wires 220 extend from the rear 162 of the bracket 150. The sensor wires 220 extend from the inner chamber 154 rearward from the bracket 150 for electrical connection with the fixture wires 44. For example, the light fixture control module 100 is field installable by connecting the sensor wires 220 and the fixture wires 44 at the top of the pole, such as at the base 110.

In an exemplary embodiment, the sensor connector 410 is used to electrically connect the sensor wires 220 and the fixture wires 44. In an exemplary embodiment, the sensor connector 410 is directly connected to the sensor wires 220 and is directly connected to the fixture wires 44. In an exemplary embodiment, the sensor connector 410 is a splice connector configured to directly connect the sensor wires 220 and the fixture wires 44. Other types of sensor connectors may be used in alternative embodiments.

In an exemplary embodiment, the sensor connector 410 includes a sensor connector housing 420 holding one or more sensor terminals 430 (shown in phantom in FIG. 17). The sensor connector housing 420 extends between a first end 422 and a second end 424. The sensor wires 220 are connected to the sensor connector housing 420 at the first end 422. The second end 424 defines a mating end for the fixture wire assembly 70. For example, the fixture wires 44 of the fixture wire assembly 70 may be coupled to the sensor connector housing 420 at the second end 424. In an exemplary embodiment, the sensor connector housing 420 includes wire channels 426 at the first end 422 and/or the second end 424. The wire channels 426 receive the ends of the sensor wires 220 and/or the ends of the fixture wires 44.

The sensor terminals 430 are received in corresponding wire channels 426. The sensor terminals 430 may be splice terminals configured to directly receive the sensor wires 220 and the fixture wires 44 at opposite ends of the splice terminals. The sensor terminals 430 may be terminated to the sensor wires 220 by one of a solder connection, a crimp connection, a poke in connection, a compression connection, an insulation displacement connection, or another type of electrical connection. The sensor terminals 430 may be terminated to the fixture wires 44 by one of a solder connection, a crimp connection, a poke in connection, a compression connection, an insulation displacement connection, or another type of electrical connection.

In an exemplary embodiment, the sensor connector housing 420 includes lock levers 428 rotatably coupled to the sensor connector housing 420. The lock levers 428 may be opened and closed. The lock levers 428 may lock the sensor wires 220 and/or the fixture wires 44 in the sensor connector housing 420 when the lock levers 428 are closed. The lock levers 428 may interface with the sensor terminals 430 to electrically connect the sensor terminals 430 to the sensor wires 220 and/or the fixture wires 44 when the lock levers 428 are in the closed or locked position. In the illustrated embodiment, the lock levers 428 are provided at both ends 422, 424 of the sensor connector housing 420. However, the lock levers 428 may be provided at the first end 422 or the second end 424 in alternative embodiments. Other locations are possible in alternative embodiments, such as the top and/or the bottom and/or the sides of the sensor connector housing 420.

In the illustrated embodiment, the light fixture control module 100 includes three sensor wires 220 and three fixture wires 44. The light fixture control module 100 may include greater or fewer wires in alternative embodiments. The sensor connector housing 420 includes a corresponding number of wire channels 426 and sensor wires 220. In an exemplary embodiment, a length of the sensor wires 220 extends rearward of the bracket 150 to allow ease of assembly and mating with the sensor connector 410 and the fixture wires 44, such as for easy field installation. The chamber at the rear 162 of the bracket 150 may be sized to receive the extra length of sensor wires 220, fixture wires 44 and the sensor connector 410.

Figure 18:
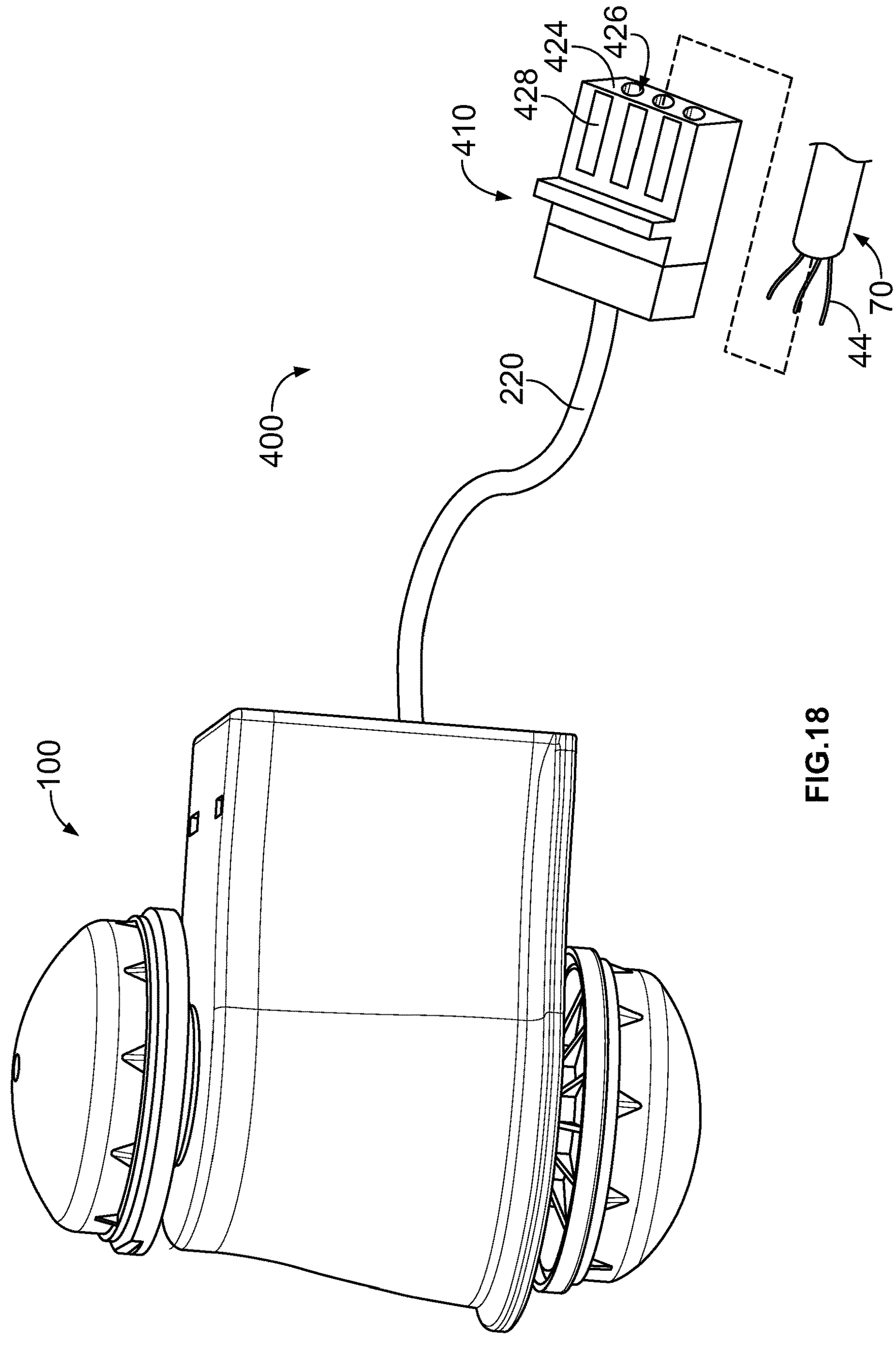
FIG. 18 illustrates the light fixture control module with an embodiment of the connection assembly in accordance with an exemplary embodiment.

FIG. 18 illustrates the light fixture control module 100 with an embodiment of the connection assembly 400. In an exemplary embodiment, the sensor connector 410 is terminated to the ends of the sensor wires 220. The sensor connector 410 may be pre-terminated to the sensor wires 220 prior to assembly to the fixture wires 44 and the base 110 at the top of the pole. For example, the sensor connector 410 may have a permanent connection to the sensor wires 220, such as a solder connection or crimp connection. The fixture wires 44 are configured to be connected to the sensor connector 410 at the mating end of the sensor connector 410. For example, the sensor connector 410 is a lever lock connector having lock levers 428 at the second end 424 configured to make a mechanical and electrical connection with the fixture wires 44. For example, the ends of the fixture wires 44 may be plugged into the wire channels 426 to mate with the sensor terminals 430. The lock levers 428 are closed to lock the ends of the fixture wires 44 in the sensor connector 410 and make an electrical connection between the fixture wires 44 and the sensor terminals 430.

Figure 19:
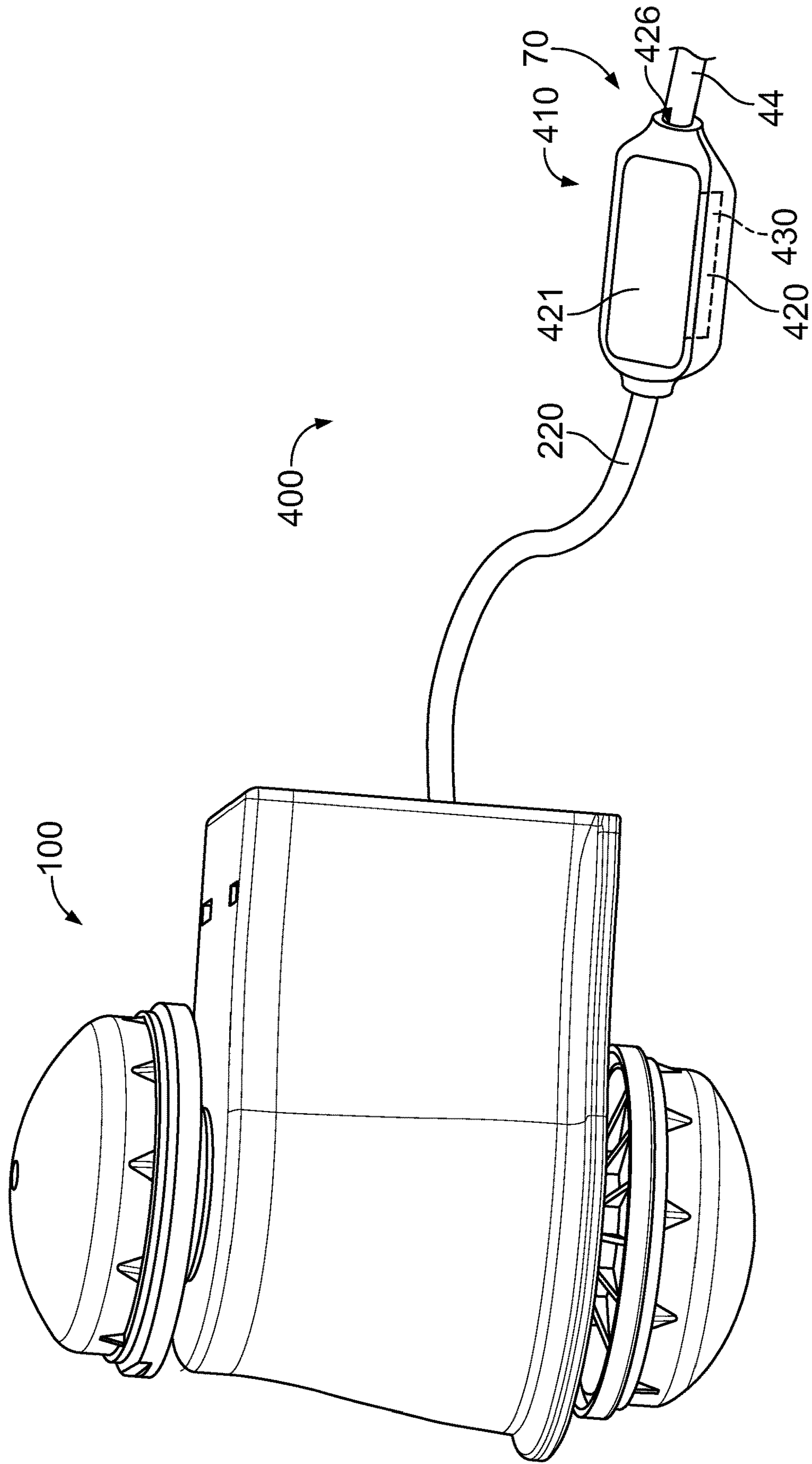
FIG. 19 illustrates the light fixture control module with an embodiment of the connection assembly in accordance with an exemplary embodiment.

FIG. 19 illustrates the light fixture control module 100 with an embodiment of the connection assembly 400. In an exemplary embodiment, the sensor connector 410 is configured to be connected to the ends of the sensor wires 220 and the ends of the fixture wires 44. In an exemplary embodiment, the sensor connector 410 is an insulation displacement connector. The sensor terminals 430 have insulation displacement contacts at one or both ends for termination to the sensor wires 220 and/or the fixture wires 44. The sensor connector 410 forms a splice connection between the sensor wires 220 and the fixture wires 44.

In an exemplary embodiment, the sensor connector housing 420 includes a cover 421 configured to be coupled to the sensor connector housing 420, such as the top of the sensor connector housing 420. Optionally, the cover 421 may be pivotably coupled to the sensor connector housing 420 to pivot or rotate between an open position and a closed position. In alternative embodiments, the cover 421 may be separate from the sensor connector housing 420 and removable from the sensor connector housing 420, such as to expose the wire channels 426 and allow placement of the wires 220, 44 in the wire channels 426. The cover 421 is used to press the sensor wires 220 and/or the fixture wires 44 into the insulation displacement contacts at the ends of the sensor terminals 430 to make an electrical connection between the sensor terminals 430 and the wires 220, 44.

Figure 20:
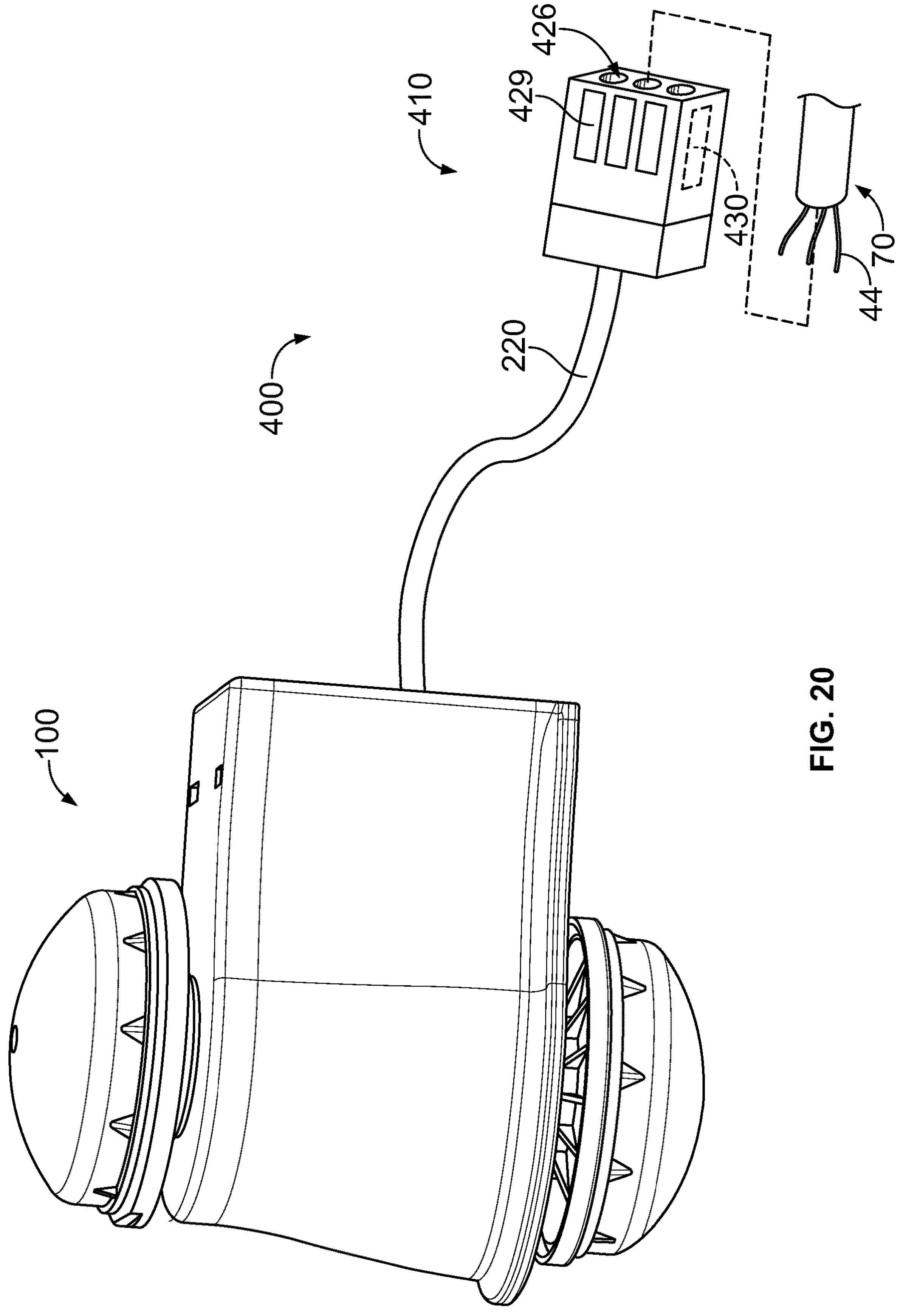
FIG. 20 illustrates the light fixture control module with an embodiment of the connection assembly in accordance with an exemplary embodiment.

FIG. 20 illustrates the light fixture control module 100 with an embodiment of the connection assembly 400. In an exemplary embodiment, the sensor connector 410 is terminated to the ends of the sensor wires 220. The sensor connector 410 may be pre-terminated to the sensor wires 220 prior to assembly to the fixture wires 44 and the base 110 (shown in FIG. 2) at the top of the pole. For example, the sensor connector 410 may have a permanent connection to the sensor wires 220, such as a solder connection or crimp connection. The fixture wires 44 are configured to be connected to the sensor connector 410 at the mating end of the sensor connector 410. For example, the sensor connector 410 is a poke in connector. The ends of the fixture wires 44 are configured to be poked into the wire channels 426 to make an electrical connection with the sensor terminals 430. The sensor terminals 430 may be poke in contacts having a spring beam configured to mechanically and electrically engage the end of the corresponding fixture wire 44 when the fixture wires 44 is plugged into the wire channel 426. The sensor connector 410 may include release levers 429 to release the poke in contacts from the fixture wires 44 to allow removal of the fixture wires 44.

Figure 21:
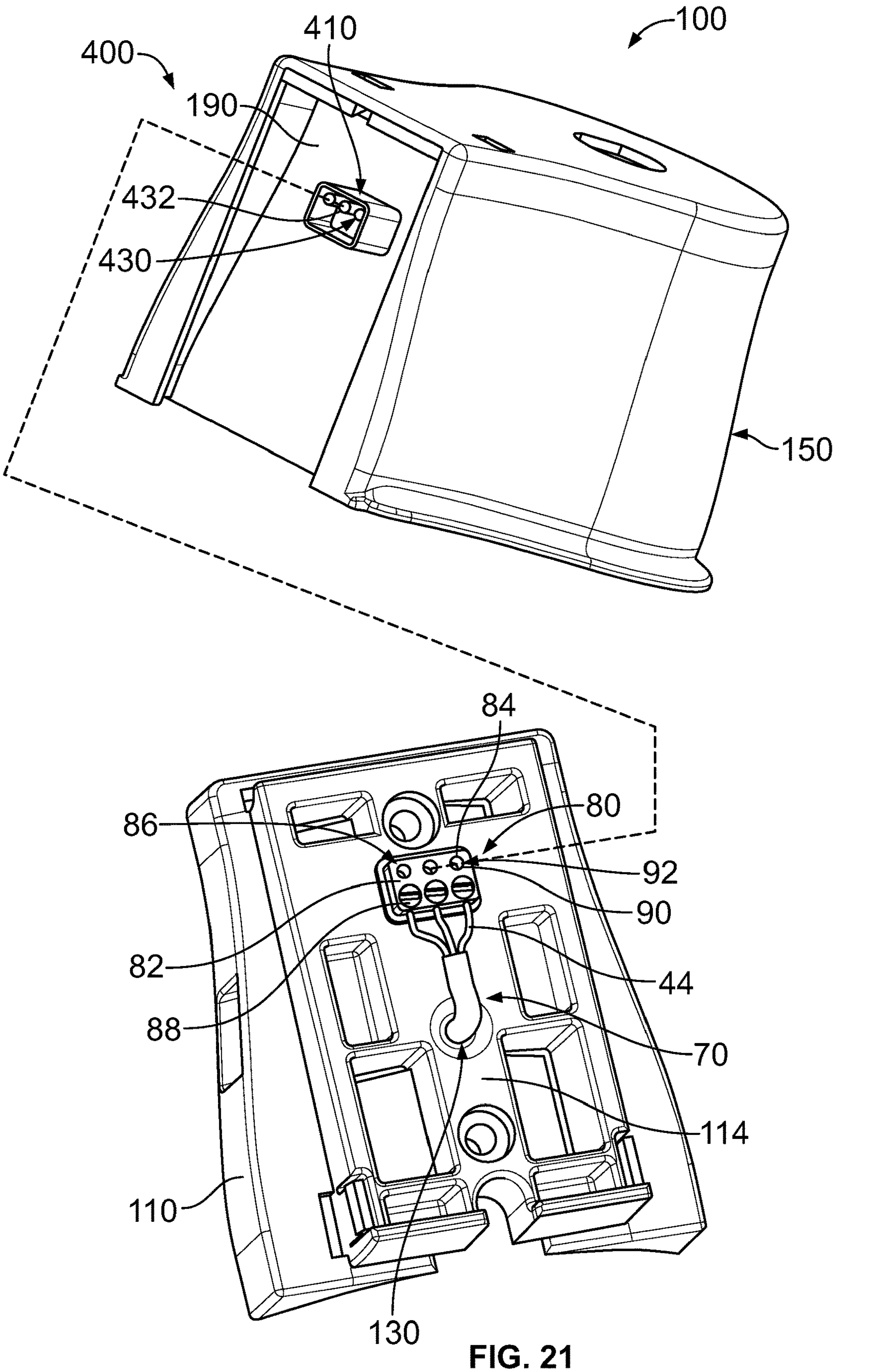
FIG. 21 illustrates the light fixture control module with an embodiment of the connection assembly in accordance with an exemplary embodiment.

FIG. 21 illustrates the light fixture control module 100 with an embodiment of the connection assembly 400. In an exemplary embodiment, the sensor connector 410 is configured to be connected to the fixture wire assembly 70. For example, the sensor connector 410 is configured to be automatically connected to the fixture wire assembly 70 when the bracket 150 is coupled to the base 110, without the need to separately connect the fixture wires 44 to the sensor connector 410.

In an exemplary embodiment, the sensor connector 410 is mounted to the end wall 190. For example, the sensor connector 410 may pass through an opening in the end wall 190. The mating end of the sensor connector 410 extends rearward of the end wall 190 for mating with the fixture wire assembly 70. In an exemplary embodiment, the sensor terminals 430 are terminated to the corresponding sensor wires (not shown), such as by solder connections, crimp connections, poke in connections, compression connections, insulation displacement connections, and the like. Mating ends of the sensor terminals 430 are provided at the mating end of the sensor connector 410 for mating with the fixture wire assembly 70. In the illustrated embodiment, the mating ends of the sensor terminals 430 include pins 432. However, other types of mating ends may be provided in alternative embodiments, such as sockets, spring beams, blades, and the like. The mating ends of the sensor terminals 430 define separable mating interfaces configured to be mated to and unmated from the fixture wire assembly 70.

In an exemplary embodiment, the fixture wire assembly 70 includes the fixture wires 44 and a fixture connector 80. The fixture wires 44 are connected to the fixture connector 80. The sensor connector 410 is configured to be coupled to the fixture connector 80 to make an electrical connection between the sensor wires 220 and the fixture wires 44 to control operation of the light element of the light fixture.

In an exemplary embodiment, the fixture connector 80 includes a fixture connector housing 82 holding one or more fixture terminals 90. The fixture connector housing 82 has a mating end 84. The mating end 84 forms a separable mating interface configured to be mated with and unmated from the mating end of the sensor connector 410. The fixture wires 44 are electrically connected to the corresponding fixture terminals 90. In an exemplary embodiment, the fixture connector housing 82 includes wire channels 86 that receive the ends of the corresponding fixture wires 44. The fixture terminals 90 are located in the wire channels 86 for termination of the ends of the fixture wires 44 to the fixture terminals 90.

In an exemplary embodiment, the fixture terminals 90 include sockets 92 at the mating ends thereof. The sockets 92 are configured to receive the mating ends of the sensor terminals 430. For example, the sensor terminals 430 may include pins 432 at the mating ends configured be plugged into the sockets 92. In an exemplary embodiment, the fixture connector 80 includes actuators 88, such as screws, configured to create a mechanical and electrical connection between the ends of the fixture wires 44 and the fixture terminals 90. The actuators 88 are actuated, such as being screwed or tightened, to form a compression connection between the ends of the fixture wires 44 and terminating ends of the fixture terminals 90. Other types of mechanical and electrical connections may be made between the fixture wires 44 and the fixture terminals 90, such as solder connections, crimp connections, poke in connections, compression connections, insulation displacement connections, and the like.

In an exemplary embodiment, the fixture connector 80 is mounted to the base 110. For example, the mating end 84 of the fixture connector 80 is at the outer end 114 of the base 110. The mating end 84 of the fixture connector 80 faces rearward for mating with the sensor connector 410 when the bracket 150 is coupled to the base 110. The fixture wires 44 pass through the wire channel 130 in the base 110. The fixture wires 44 are configured to be terminated to the fixture terminals 90, such as when the base 110 is mounted to the pole. In an alternative embodiment, the fixture connector 80 may be free from the base 110 and configured to be connected to the sensor connector 410 prior to mounting the bracket 150 to the base 110. In such embodiments, the fixture connector 80 and the sensor connector 410 may be located in the pocket or space formed in the chamber of the bracket, such as forward of the base 110.

Figure 22:
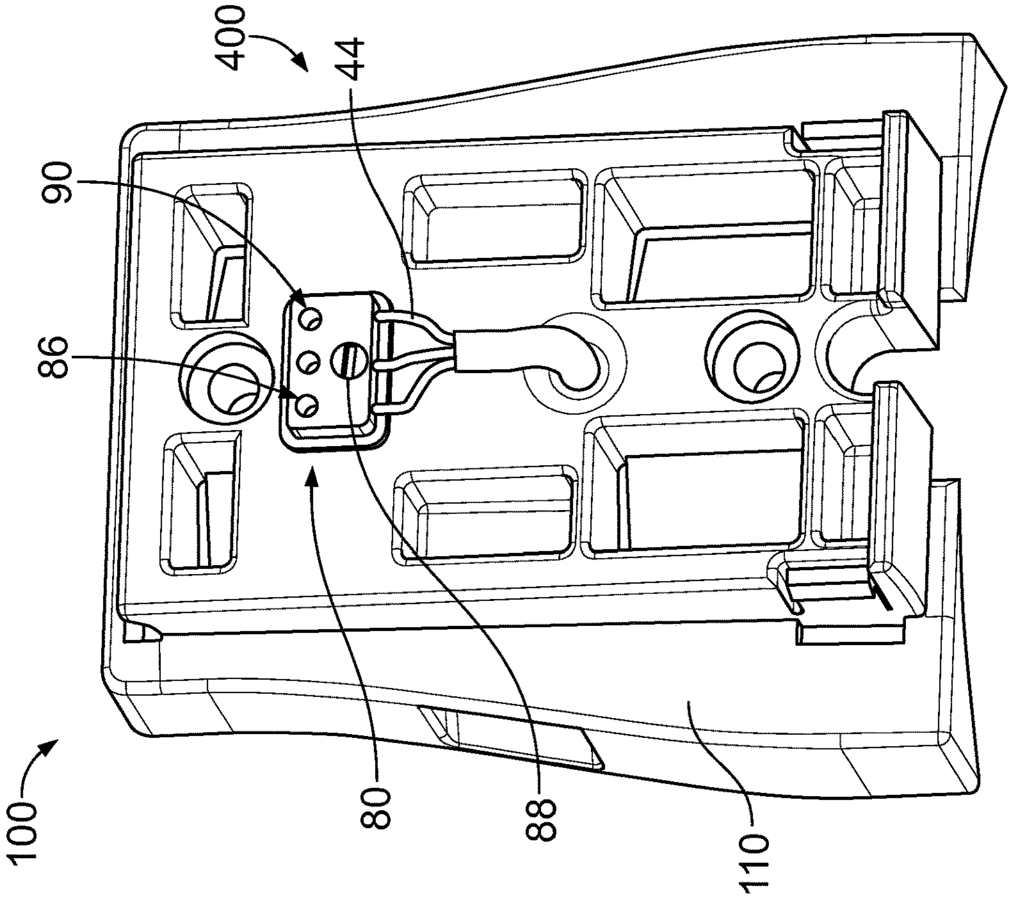
FIG. 22 illustrates the light fixture control module with an embodiment of the connection assembly in accordance with an exemplary embodiment.

FIG. 22 illustrates the light fixture control module 100 with an embodiment of the connection assembly 400. In an exemplary embodiment, the fixture connector 80 is mounted to the base 110. In the illustrated embodiment, the fixture connector 80 includes a single actuator 88 used to mechanically and electrically connect all of the fixture wires 44 to the fixture terminals 90 simultaneously rather than individual actuators 88 as shown in FIG. 21. For example, the actuator 88 may be a single screw configured to press levers or arms inward in each of the wire channels 86 to press the fixture wires 44 into electrical connection with the terminating ends of the fixture terminals 90.

Figure 23:
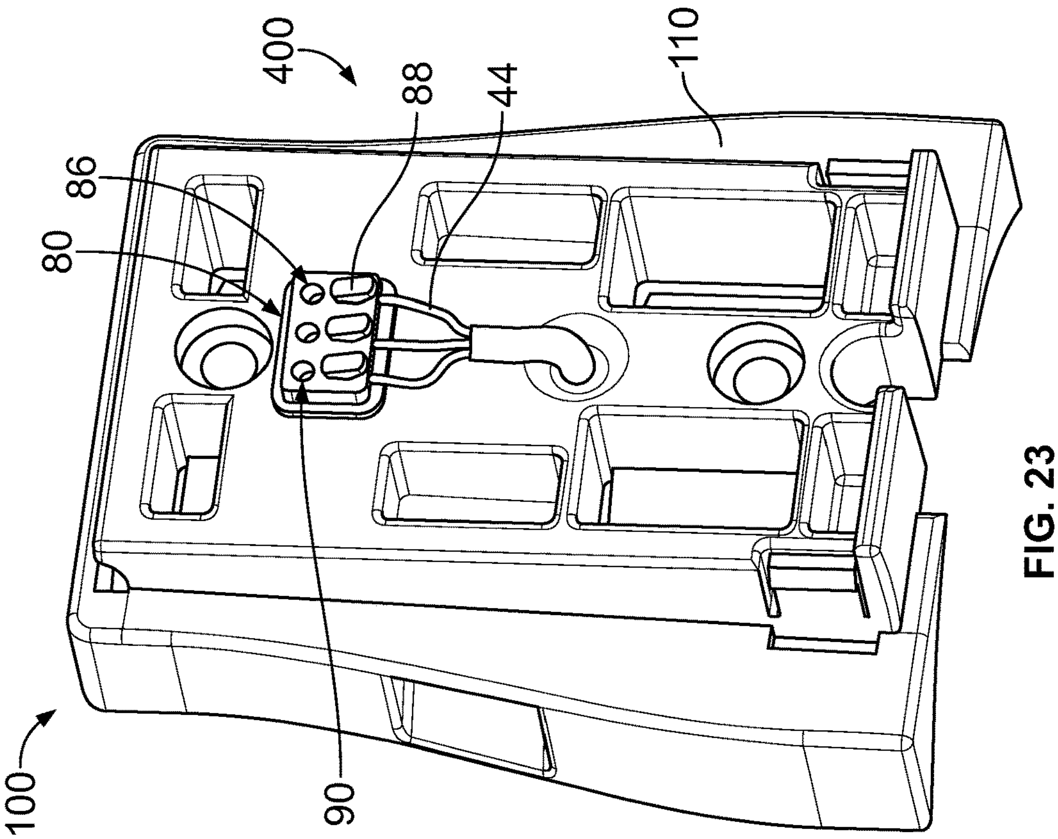
FIG. 23 illustrates the light fixture control module with an embodiment of the connection assembly in accordance with an exemplary embodiment.

FIG. 23 illustrates the light fixture control module 100 with an embodiment of the connection assembly 400. In an exemplary embodiment, the fixture connector 80 is mounted to the base 110. In the illustrated embodiment, the fixture connector 80 includes mechanical actuators 88 in the form of levers. The levers may be lock levers used to lock the fixture wires 44 in the wire channels 86, such as by pressing inward on the fixture wires 44. In other various embodiments, the levers may be release levers used to release the fixture terminals 90 from the ends of the fixture wires 44. For example, the terminating ends of the fixture terminals 90 may be poke in contacts or beams and the levers may release the poke in beams.

Figure 24:
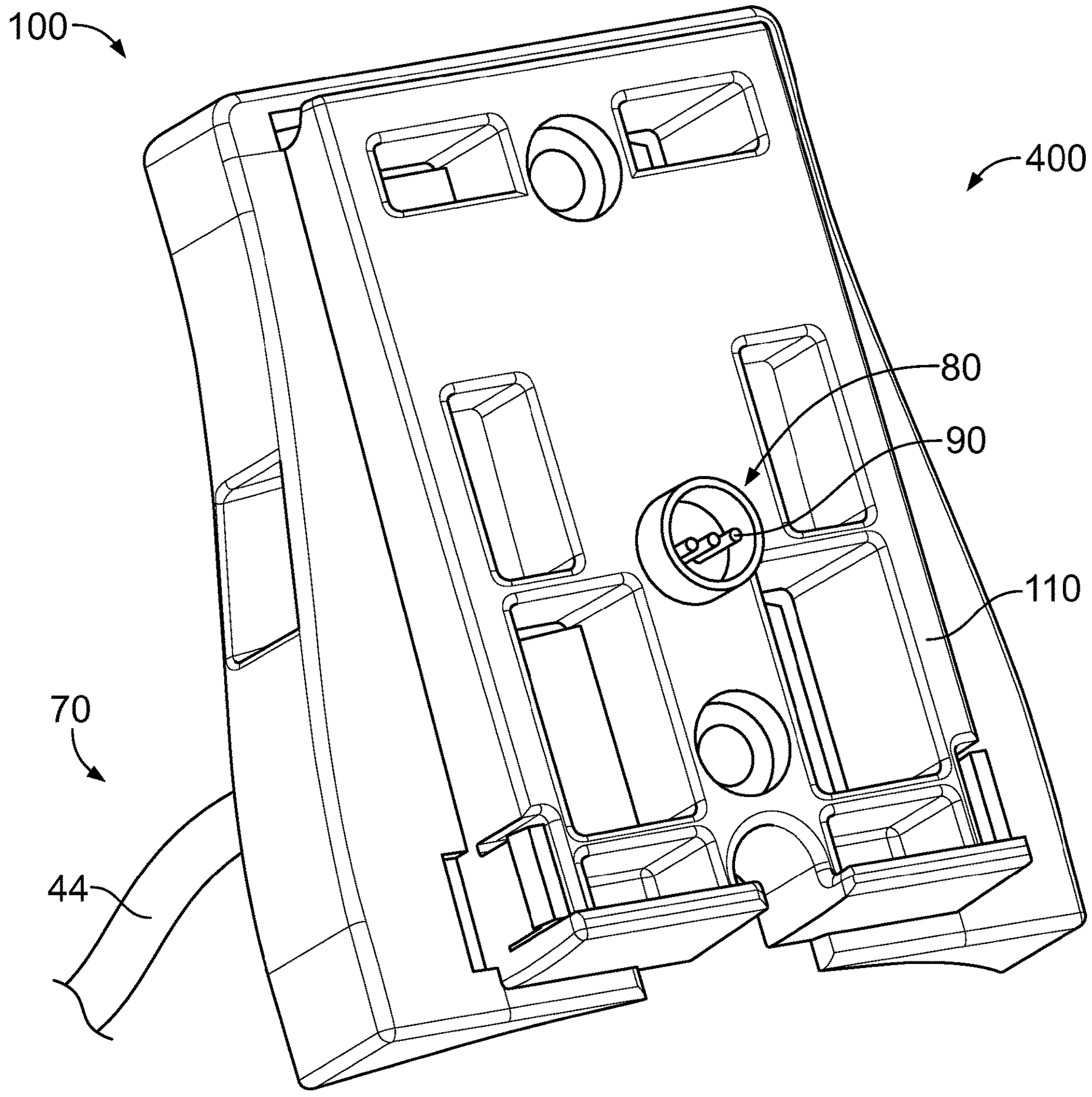
FIG. 24 illustrates the light fixture control module with an embodiment of the connection assembly in accordance with an exemplary embodiment.

FIG. 24 illustrates the light fixture control module 100 with an embodiment of the connection assembly 400. In an exemplary embodiment, the fixture connector 80 is mounted to the base 110. In the illustrated embodiment, the fixture connector 80 is a cylindrical connector, such as a plug connector or receptacle connector. The fixture connector 80 is provided at the end of the fixture wire assembly 70. The fixture connector 80 holds the fixture terminals 90 for mating with the sensor connector 410. In an exemplary embodiment, the fixture connector 80 is loaded into an opening in the base 110 to pass through the base 110. The fixture wires 44 remain interior of the base 110, such as interior of the pole. The fixture connector 80 may be a 3-position connector or a 6-position connector, having three or six fixture terminals 90, respectively.

Figure 25:
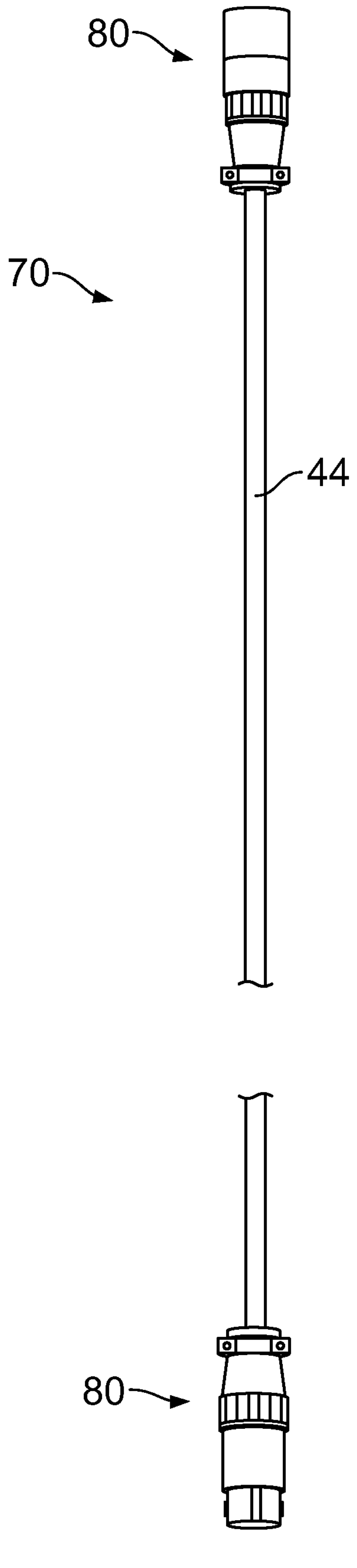
FIG. 25 illustrates the fixture wire assembly in accordance with an exemplary embodiment, such as including the fixture connector shown in FIG. 24.

FIG. 25 illustrates the fixture wire assembly 70 in accordance with an exemplary embodiment, such as including the fixture connector 80 shown in FIG. 24. The fixture wire assembly 70 may include another fixture connector at the opposite end of the fixture wires 44, such as for connection to the control module.

Figure 26:
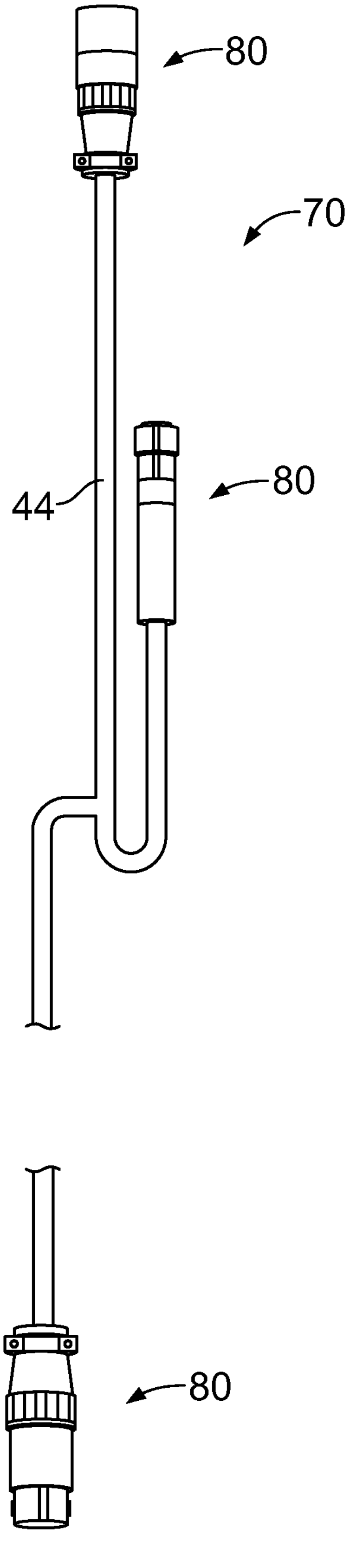
FIG. 26 illustrates the fixture wire assembly in accordance with an exemplary embodiment, such as including the fixture connector shown in FIG. 24.

FIG. 26 illustrates the fixture wire assembly 70 in accordance with an exemplary embodiment, such as including the fixture connector 80 shown in FIG. 24. The fixture wire assembly 70 may be split into multiple fixture connectors 80, such as including a pigtail harness, to split the signals and/or power. One or more of the fixture connectors 80 may be provided at the base 110 for connection to the sensor connector(s) 410.

Figure 27:
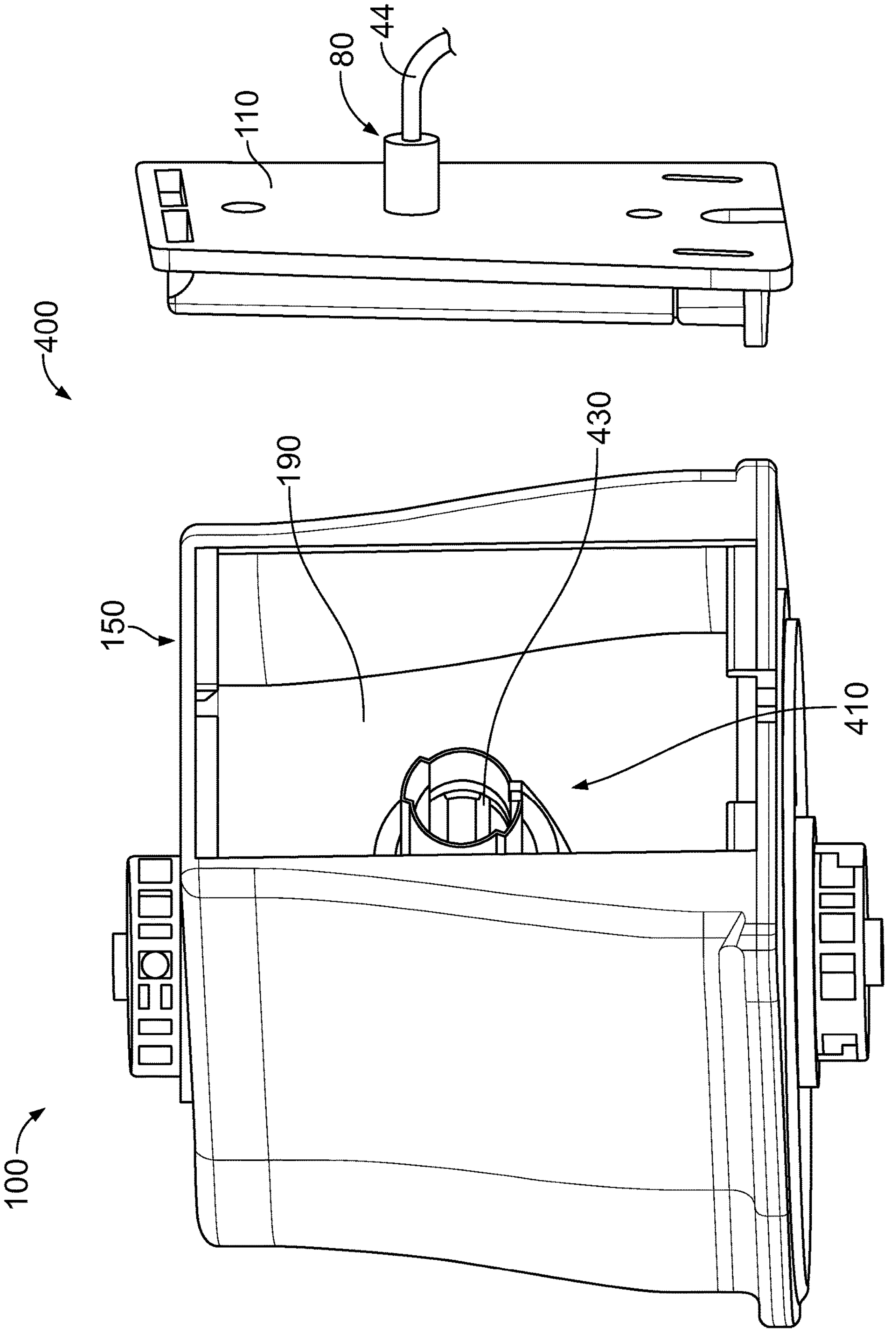
FIG. 27 illustrates the light fixture control module with an embodiment of the connection assembly in accordance with an exemplary embodiment.

FIG. 27 illustrates the light fixture control module 100 with an embodiment of the connection assembly 400. In an exemplary embodiment, the sensor connector 410 is mounted to the bracket 150, such as to the end wall 190. In the illustrated embodiment, the sensor connector 410 is a cylindrical connector, such as a plug connector or receptacle connector. The sensor connector 410 is provided at the end of the sensor wires 220 (not shown). The sensor connector 410 holds the sensor terminals 430 for mating with the fixture connector 80. The sensor terminals 430 may be pins, sockets, spring beams, or other types of mating contacts. In an exemplary embodiment, the sensor connector 410 is loaded into an opening in the end wall 190 to pass through the end wall 190. The sensor connector 410 may be a 3-position connector or a 6-position connector, having three or six fixture terminals 90, respectively. The sensor connector 410 is mated with the fixture connector 80 when the bracket 150 is mounted to the base 110.

Figure 28:
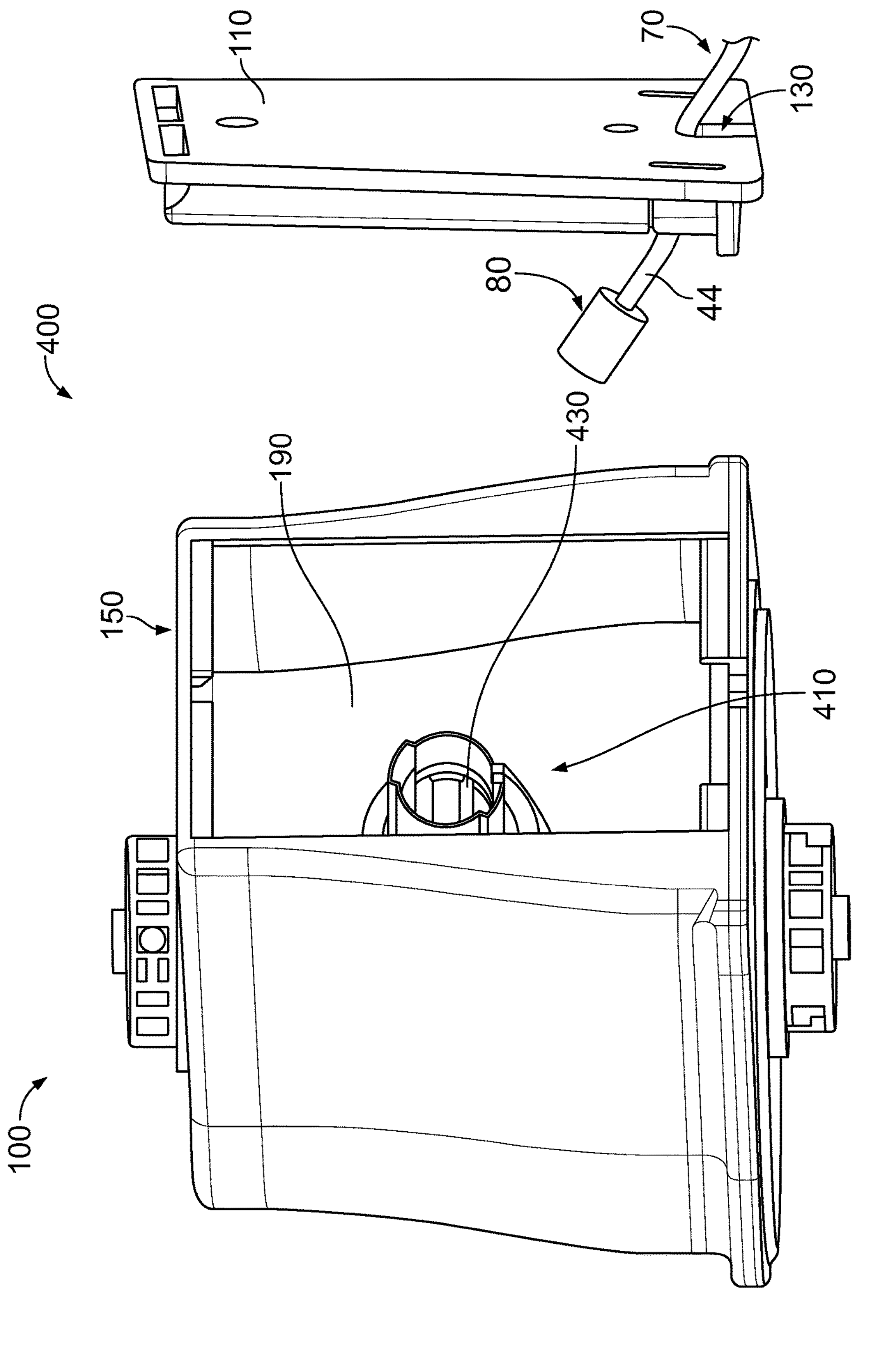
FIG. 28 illustrates the light fixture control module with an embodiment of the connection assembly in accordance with an exemplary embodiment.

FIG. 28 illustrates the light fixture control module 100 with an embodiment of the connection assembly 400. In the illustrated embodiment, the fixture connector 80 is mounted to the sensor connector 410 independent of the base 110. For example, the fixture wires 44 may pass through the wire channel 130 of the base 110 and the fixture connector 80 is free of the base 110. The fixture wires 44 pass from an interior of the vertical mounting base to the outer end of the base 110. The fixture connector 80 is configured to be connected to the sensor connector 410 forward of the outer end of the base 110 and may be received in the inner chamber of the bracket 150.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. A light fixture control module comprising:
- a base including an inner end and an outer end, the inner end being mounted to a vertical mounting base of a light fixture;
- a bracket coupled to the outer end of the base, the bracket surrounding and covering the base, the bracket including a shell having an inner chamber; and
- a sensor mounted to the shell of the bracket, the sensor having a sensor element, a sensor wire transmitting a control signal from the sensor element, and a sensor connector connected to an end of the sensor wire, the sensor connector configured to be electrically connected to a fixture wire of the light fixture to control operation of a light element of the light fixture.

2. The light fixture control module of claim 1, wherein the sensor connector includes a sensor connector housing holding a terminal, the sensor wire terminated to the terminal.

3. The light fixture control module of claim 2, wherein the sensor wire is one of a plurality of sensor wires, the terminal being one of a plurality of terminals held by the sensor connector housing being terminated to the corresponding sensor wires.

4. The light fixture control module of claim 2, wherein the terminal includes a first end and a second end, the first end terminated to the sensor wire, the second end configured to be terminated to the fixture wire to electrically connect the sensor wire and the fixture wire.

5. The light fixture control module of claim 2, wherein the terminal is connected to the sensor wire by one of a solder connection, a crimp connection, a poke in connection, a compression connection, or an insulation displacement connection.

6. The light fixture control module of claim 1, wherein the sensor connector includes a splice connector for directly connecting the sensor wire and the fixture wire.

7. The light fixture control module of claim 1, wherein the sensor connector is a poke in wire connector configured to receive the sensor wire and/or the fixture wire by a poke in connection.

8. The light fixture control module of claim 1, wherein the sensor connector includes a sensor connector housing holding a terminal, the sensor wire terminated to the terminal, the terminal having a separable mating interface at a mating end of the sensor connector housing, the mating end configured to be mated with a fixture connector.

9. The light fixture control module of claim 8, wherein the fixture connector is mounted to the base, the sensor connector mated with the fixture connector when the bracket is coupled to the base.

10. The light fixture control module of claim 8, wherein the bracket includes an end wall facing the base, the sensor connector housing being mounted to the end wall.

11. The light fixture control module of claim 1, further comprising a fixture connector mounted to the base, the fixture connector configured to be electrically connected to the fixture wire, the fixture connector including a separable mating interface for mating with the sensor connector.

12. The light fixture control module of claim 11, wherein the fixture connector includes a fixture connector housing holding a fixture terminal, the fixture terminal including a mating end and a terminating end, the terminating end configured to be terminated to the fixture wire, the mating end configured to be mated to a sensor terminal of the sensor connector.

13. The light fixture control module of claim 12, wherein the fixture terminal is configured to be terminated to the fixture wire by one of a solder connection, a crimp connection, a poke in connection, a compression connection, or an insulation displacement connection.

14. The light fixture control module of claim 1, further comprising a fixture wire assembly comprising the fixture wire, the fixture wire being terminated directly to the sensor connector.

15. The light fixture control module of claim 1, further comprising a fixture wire assembly comprising the fixture wire and a fixture connector at an end of the fixture wire, the fixture connector mated to the sensor connector to electrically connect the fixture wire in the sensor wire.

16. The light fixture control module of claim 1, wherein the base includes a wire channel configured to receive the fixture wire to allow the fixture wire to pass from an interior of the vertical mounting base to the outer end of the base, the sensor connector configured to be connected to the fixture wire forward of the outer end.

17. A light fixture control module comprising:

a base including an inner end and an outer end, the inner end being mounted to a vertical mounting base of a light fixture, the base including a wire channel;

a bracket coupled to the outer end of the base, the bracket surrounding and covering the base, the bracket including a shell having an inner chamber; and a sensor mounted to the shell of the bracket, the sensor having a sensor element, a sensor wire transmitting a control signal from the sensor element, and a sensor connector connected to an end of the sensor wire, the sensor connector configured to be electrically connected to a fixture wire of the light fixture to control operation of a light element of the light fixture;

wherein the wire channel is configured to receive one of the sensor wire or the fixture wire to allow connection between the sensor connector and the fixture wire.

18. The light fixture control module of claim 17, further comprising a fixture connector mounted to the base, the fixture connector configured to be electrically connected to the fixture wire, the fixture connector including a separable mating interface for mating with the sensor connector.

19. A light fixture control module comprising:

a base including an inner end and an outer end, the inner end being mounted to a vertical mounting base of a light fixture;

a bracket coupled to the outer end of the base, the bracket including a shell having an inner chamber, the bracket including an end wall at an end of the inner chamber, the end wall facing the bracket; and a sensor mounted to the shell of the bracket, the sensor having a sensor element, a sensor wire transmitting a control signal from the sensor element, and a sensor connector connected to an end of the sensor wire, the sensor connector being mounted to the end wall of the bracket, the sensor connector having a mating end facing the base, the mating end forming a separable mating interface configured to be electrically connected to a fixture connector electrically connected to a fixture wire of the light fixture to control operation of a light element of the light fixture.

20. The light fixture control module of claim 19, wherein the sensor connector includes a sensor connector housing holding a terminal, the sensor wire terminated to the terminal.

21. The light fixture control module of claim 19, wherein the fixture connector is mounted to the base, the sensor connector mated with the fixture connector when the bracket is coupled to the base.

* * * * *